US010908938B2

(12) United States Patent
Palavalli et al.

(10) Patent No.: US 10,908,938 B2
(45) Date of Patent: Feb. 2, 2021

(54) METHODS AND SYSTEMS TO DETERMINE APPLICATION LICENSE COSTS IN A VIRTUALIZED DATA CENTER FOR USE IN VIRTUAL MACHINE CONSOLIDATION

(71) Applicant: VMWARE, INC., Palo Alto, CA (US)

(72) Inventors: Amarnath Palavalli, Bangalore (IN); Kumar Gaurav, Bangalore (IN); Nikhil Dhankani, Bangalore (IN); Dattathreya Sathyamurthy, Bangalore (IN); Servesh Singh, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/822,914

(22) Filed: Aug. 11, 2015

(65) Prior Publication Data

US 2016/0371109 A1    Dec. 22, 2016

(30) Foreign Application Priority Data

Jun. 16, 2015   (IN) .......................... 3007/CHE/2015

(51) Int. Cl.
*G06F 9/455*  (2018.01)
*G06Q 30/04*  (2012.01)

(52) U.S. Cl.
CPC ......... *G06F 9/45558* (2013.01); *G06Q 30/04* (2013.01); *G06F 2009/4557* (2013.01)

(58) Field of Classification Search
CPC ........ G06F 9/45558; G06F 2009/4557; G06Q 30/04
See application file for complete search history.

(56) References Cited

U.S. PATENT DOCUMENTS

| 8,423,998 | B2 * | 4/2013 | Isci | G06F 9/5077 |
| | | | | 717/176 |
| 8,667,171 | B2 * | 3/2014 | Guo | G06F 9/5077 |
| | | | | 709/238 |
| 8,909,785 | B2 * | 12/2014 | Franco | H04L 67/1097 |
| | | | | 709/226 |
| 2010/0036698 | A1 * | 2/2010 | Garrison | G06Q 20/20 |
| | | | | 705/16 |

(Continued)

OTHER PUBLICATIONS

Chapman, Gabriel. "Digging deeper into per VM cost analysis". Posted Feb. 15, 2012.*

(Continued)

*Primary Examiner* — Meng Ai T An
*Assistant Examiner* — Michael W Ayers

(57) ABSTRACT

Methods and systems to compute application license costs of a number of applications run on virtual machines of a virtualized data center are described. In one aspect, one or more of the virtual machines ("VMs") that form the virtual data center are determined. Each VM is created from hardware components specifications of one or more application blueprints stored in a data-storage devices. The one or more blueprints are searched to determine the one more applications that run in each VM. For each VM, a total VM application licensing cost of the one or more applications is computed based on one or more of an application instance license cost, application socket license cost, and application core license of each of the one or more applications associated with each application.

27 Claims, 24 Drawing Sheets

(56) References Cited

U.S. PATENT DOCUMENTS

| | | | |
|---|---|---|---|
| 2011/0231680 A1* | 9/2011 | Padmanabhan | G06F 1/3209 713/310 |
| 2012/0131578 A1* | 5/2012 | Ciano | G06F 9/45558 718/1 |
| 2012/0331114 A1* | 12/2012 | Garg | G06Q 10/00 709/220 |
| 2013/0042003 A1* | 2/2013 | Franco | H04L 67/1097 709/226 |
| 2014/0019968 A1* | 1/2014 | Deng | G06F 9/45558 718/1 |
| 2015/0142524 A1* | 5/2015 | Jung | G06Q 30/0206 705/7.35 |
| 2016/0188370 A1* | 6/2016 | Razin | G06F 11/30 718/104 |

OTHER PUBLICATIONS

"Red Hat Enterprise Virtualization for Servers: Pricing and Licensing Guide". Copyright 2009.*

* cited by examiner

|  | Application | Instance license vCPU / User | | Core license | Socket license |
|---|---|---|---|---|---|
| VM1 | A1 | | | b | |
|  | A5 | | q | r | |
|  | A6 | s | | | |
| VM2 | A1 | | | b | |
|  | A4 | g | h | | m |
|  | A5 | | q | r | |
| VM3 | A1 | | | b | |
|  | A4 | g | h | | m |
| VM4 | A2 | | c | | |
|  | A3 | e | | | f |
|  | A5 | | q | r | |
| VM5 | A1 | | | b | |
|  | A3 | e | | | f |
|  | A5 | | q | r | |
| VM6 | A2 | | c | | |
|  | A4 | g | h | | m |
|  | A6 | s | | | |
|  | A7 | | | t | |

FIG. 15

METHODS AND SYSTEMS TO DETERMINE APPLICATION LICENSE COSTS IN A VIRTUALIZED DATA CENTER FOR USE IN VIRTUAL MACHINE CONSOLIDATION

RELATED APPLICATIONS

Benefit is claimed under 35 U.S.C. 119(a)-(d) to Foreign application Serial No. 3007/CHE/2015 filed in India entitled "METHODS AND SYSTEMS TO DETERMINE APPLICATION LICENSE COSTS IN A VIRTUALIZED DATA CENTER", on Jun. 16, 2015, by VMware, Inc., which is herein incorporated in its entirety by reference for all purposes.

TECHNICAL FIELD

The present disclosure, is directed to determining application license costs of a variety of different applications that run on virtual machines of a virtualized data center.

BACKGROUND

In recent years, enterprises have shifted much of their computing needs from enterprise owned and operated computer systems to cloud computing, providers. A cloud computing provider charges enterprises to store and run their applications in a cloud-computing facility and run applications licensed by application vendors. Enterprises typically run their own applications or purchase licenses to applications that run on virtual machines ("VMs") in a cloud-computing facility. The VMs may be consolidated into a virtual data center ("VDC") that recreates the architecture and functionality of a physical data center for running applications. Because of the vast numbers of VDCs and dynamic nature of VDCs running in a typical cloud-computing facility. VDC's introduce challenges to managing application license costs for information technology ("IT") managers. In particular, an enterprise may purchase licenses to run a number of different applications. Assessing the application license costs for the enterprise may be challenging because of the wide variety application licensing terms and conditions. Typically, enterprises purchase a number of application licenses that are simply maintained in spread sheets and the application license costs are often disconnected from actual usage of the applications. As a result, the amount paid by an enterprise to purchase certain application licenses may not be accurately associated with the enterprises utilization of the applications.

SUMMARY

Methods and systems to compute application license costs of a number of applications run on virtual machines of a virtualized data center are described. In one aspect, one or more of the virtual machines ("VMs") that form the virtual data center are determined. Each VM is created from hardware components specifications of one or more application blueprints stored in a data-storage devices. The one or more blueprints are searched to determine the one more applications that run in each VM. For each VM, a total VM application licensing cost of the one or more applications is computed based on one or more of an application instance license cost, application socket license cost, and application core license of each of the one or more applications associated with each application.

DESCRIPTION OF THE DRAWINGS

FIG. 15 shows an example data table of license types and costs of example applications running in six example virtual machines.

DETAILED DESCRIPTION

Figure 1:
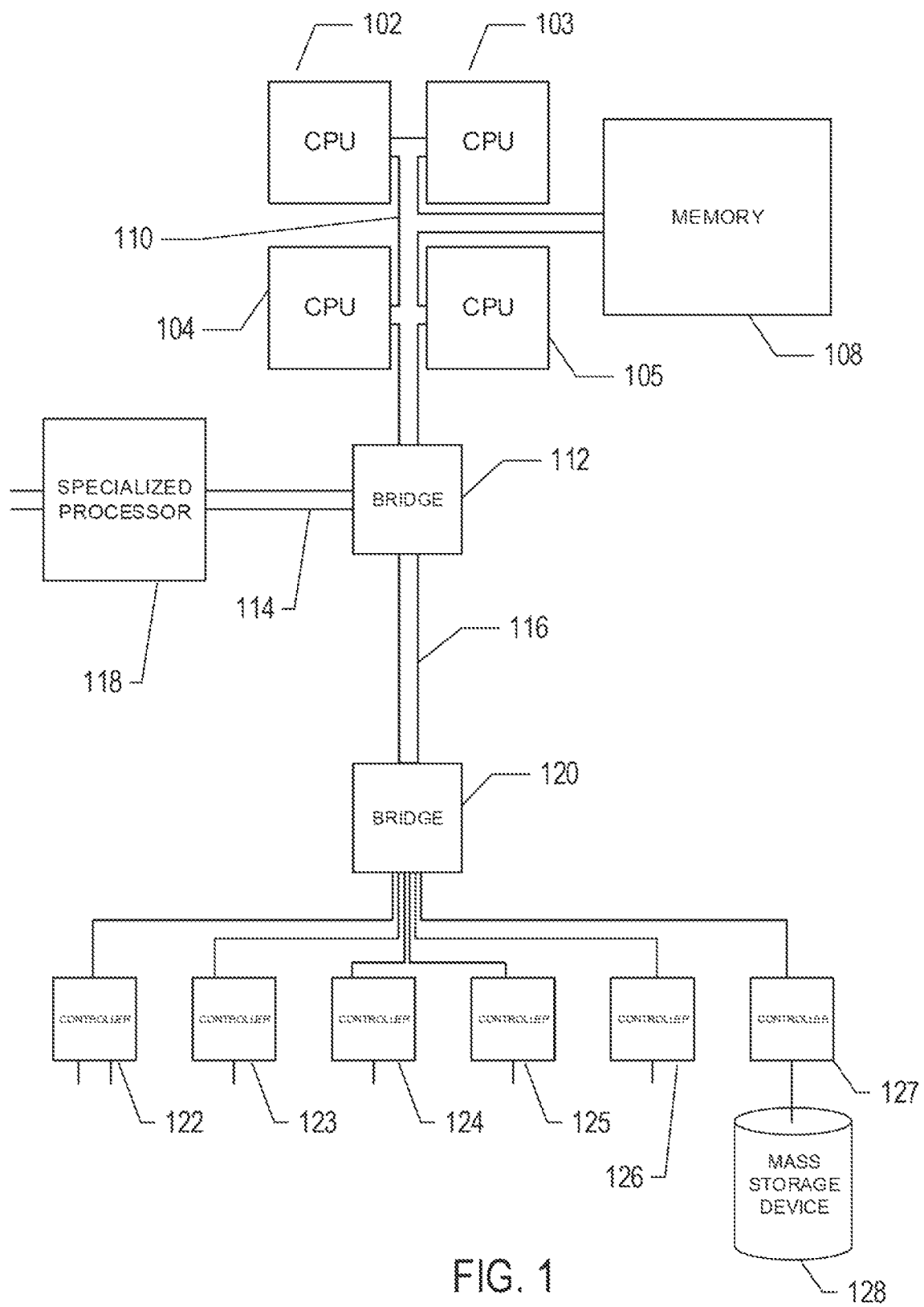
FIG. 1 shows a general architectural diagram for various types of computers.

A general description of physical data centers, hardware, virtualization, VMs, and virtual data centers are provided in a first subsection. Methods and systems to compute a total application license cost of running one or more applications in each virtual machine of a virtual data center are provided in a second subsection.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and VMs, communications interfaces, and many of the other topics discussed below are tangible, physical components of physical, electro-optical-mechanical computer systems.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic, disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
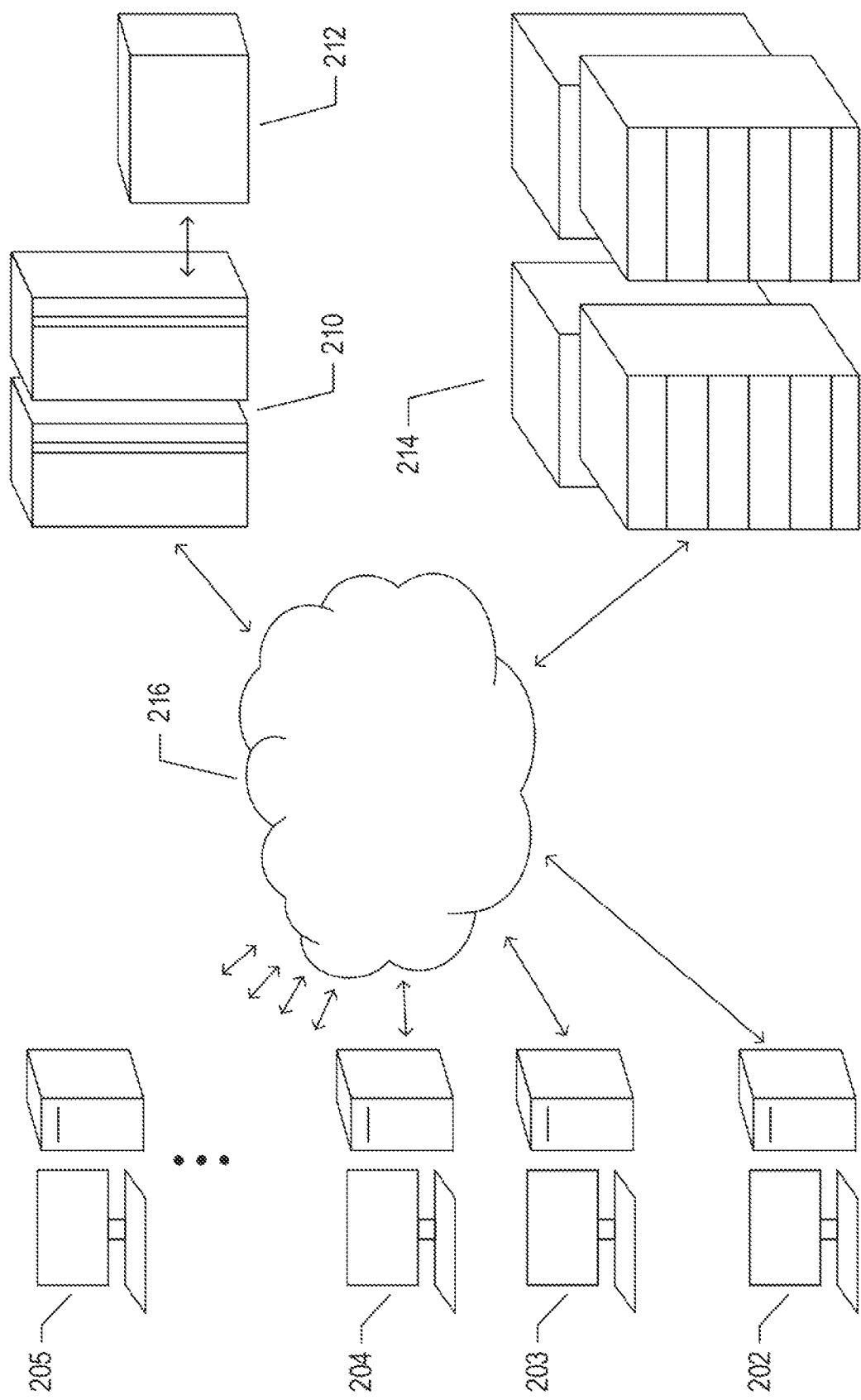
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
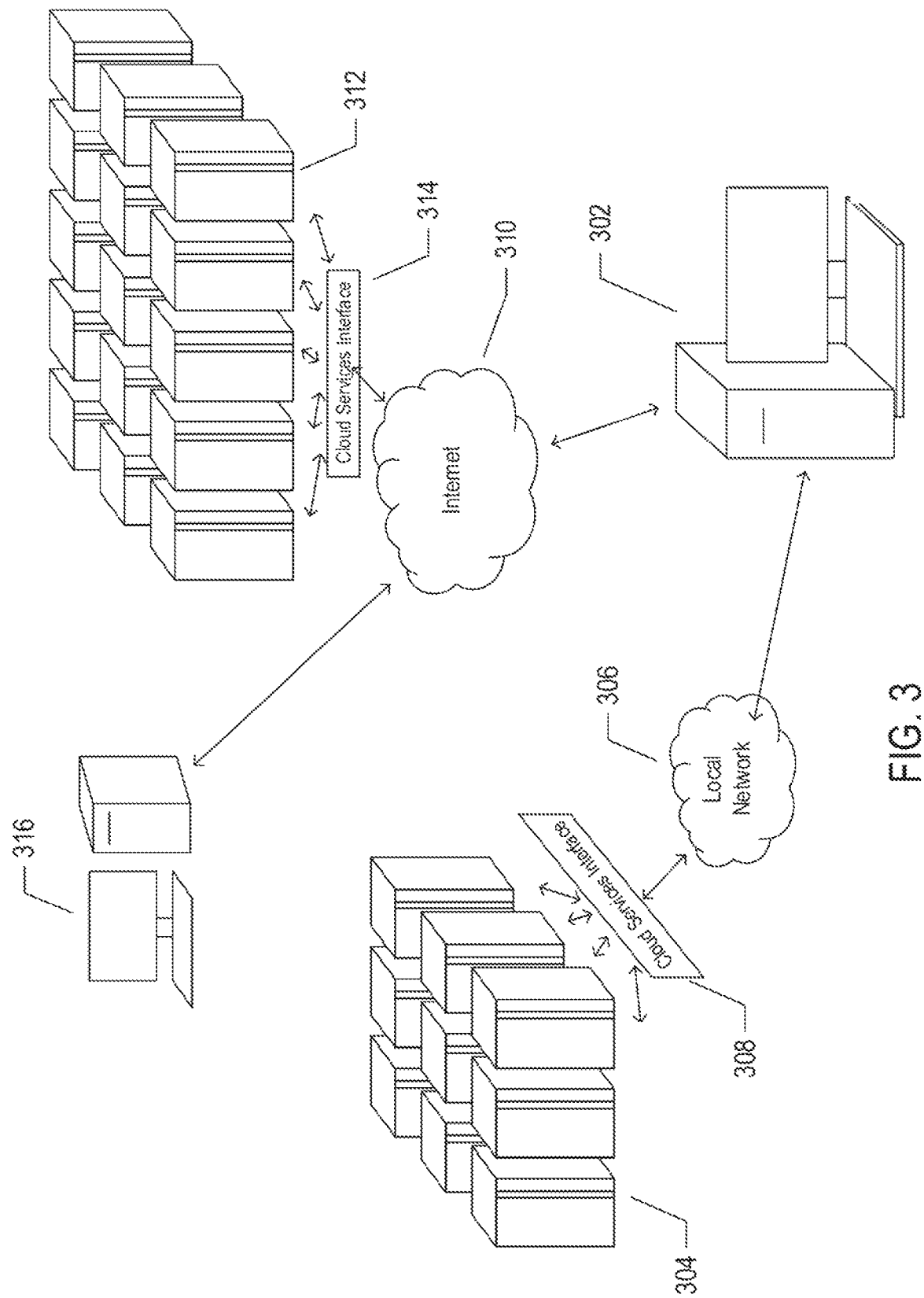
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including; hiring; and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
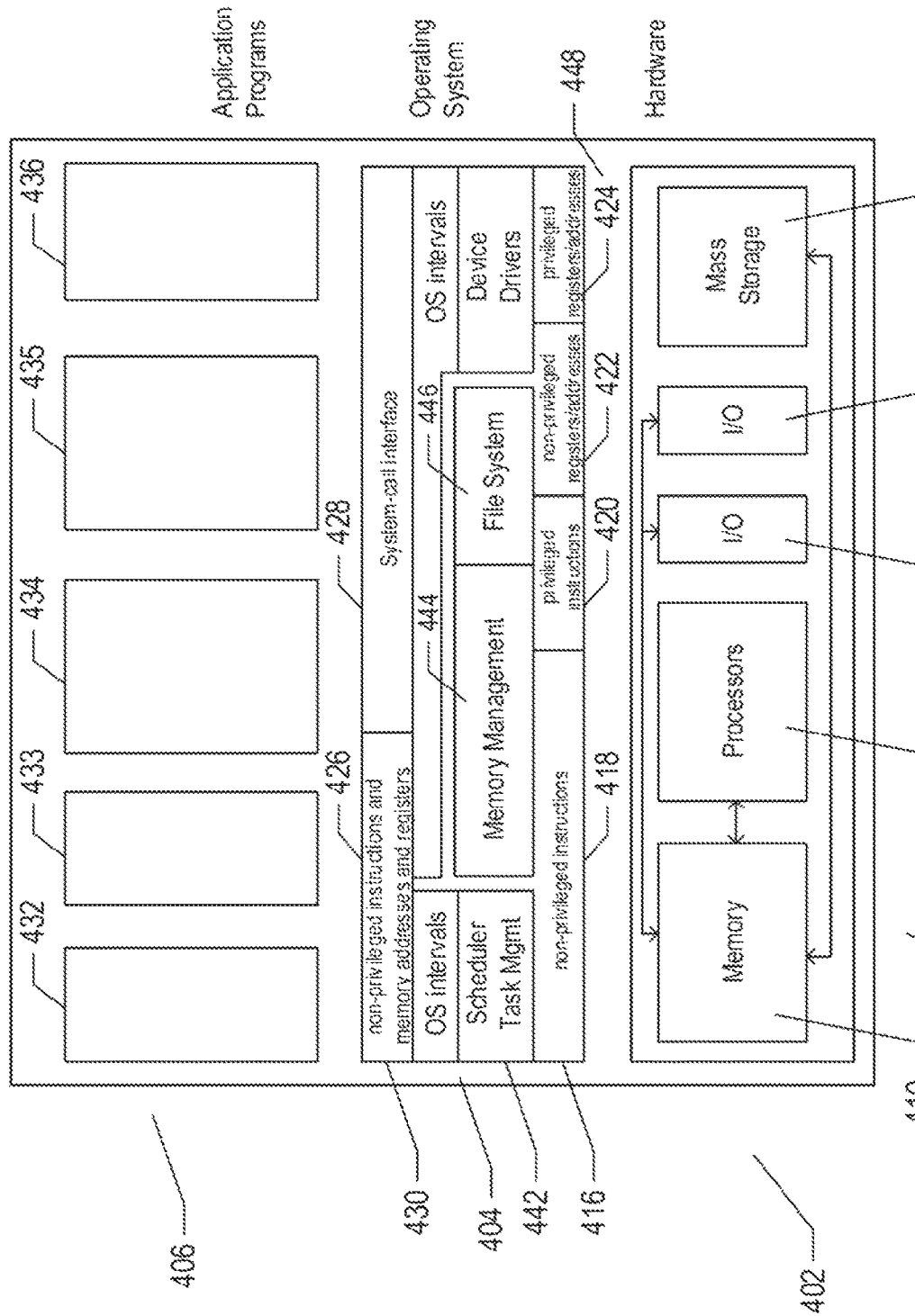
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406 The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 42$ as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application programs standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other 110 devices and subsystems. The tile system 436 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for Which the application program or other computational system was originally targeted. Another difficulty arises from the increasingly distributed nature of computer systems. Although distributed operating systems are the subject of considerable research and development efforts, marry of the popular operating systems are designed primarily for execution on a single computer system in many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
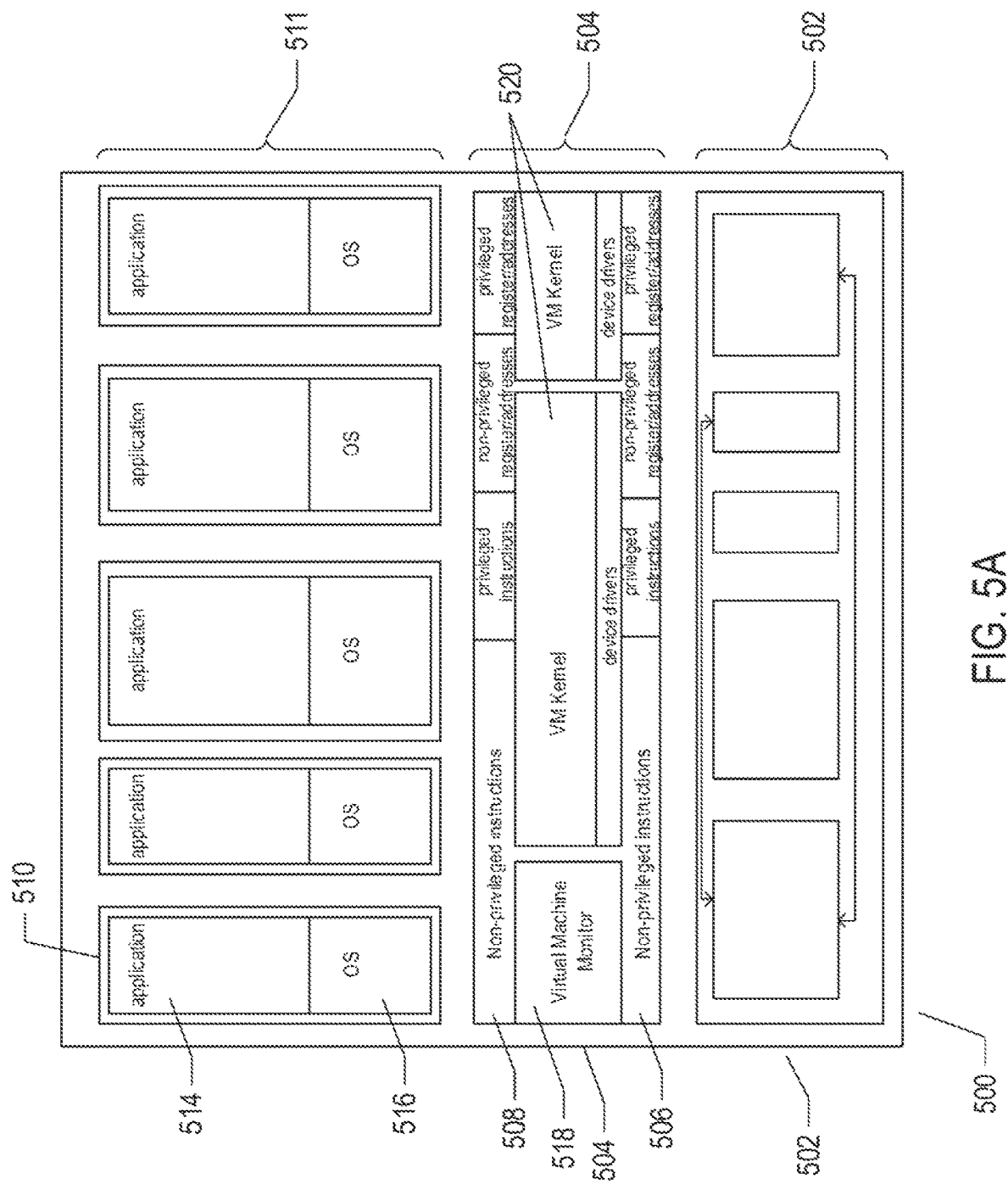
FIGS. 5A-5B show two types of virtual machine and virtual-machine execution environments.
Figure 5B:
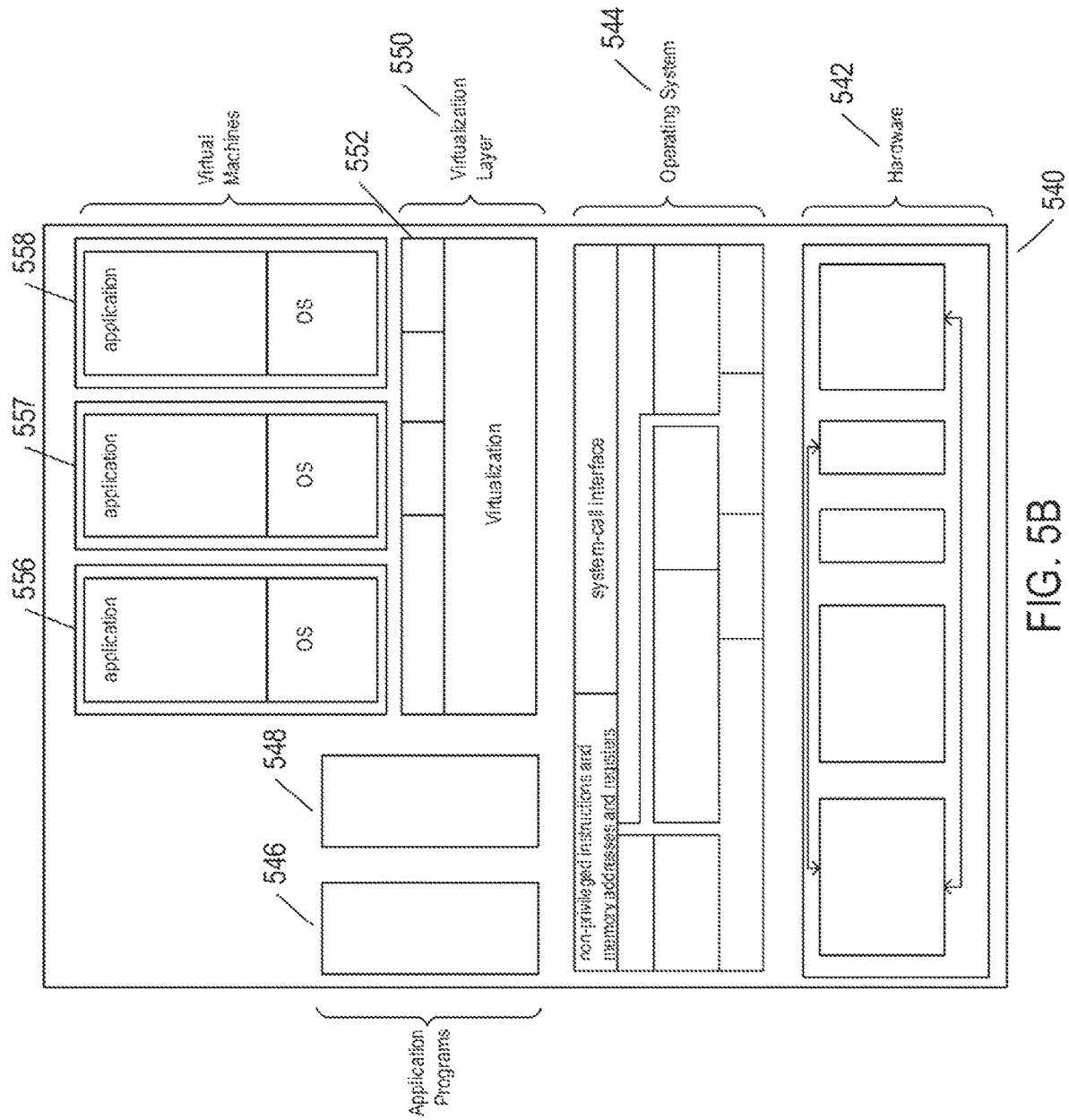

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface 508 to a number of VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization-layer interface 508 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization-layer interface 508 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization-layer interface 508, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including, keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running, in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
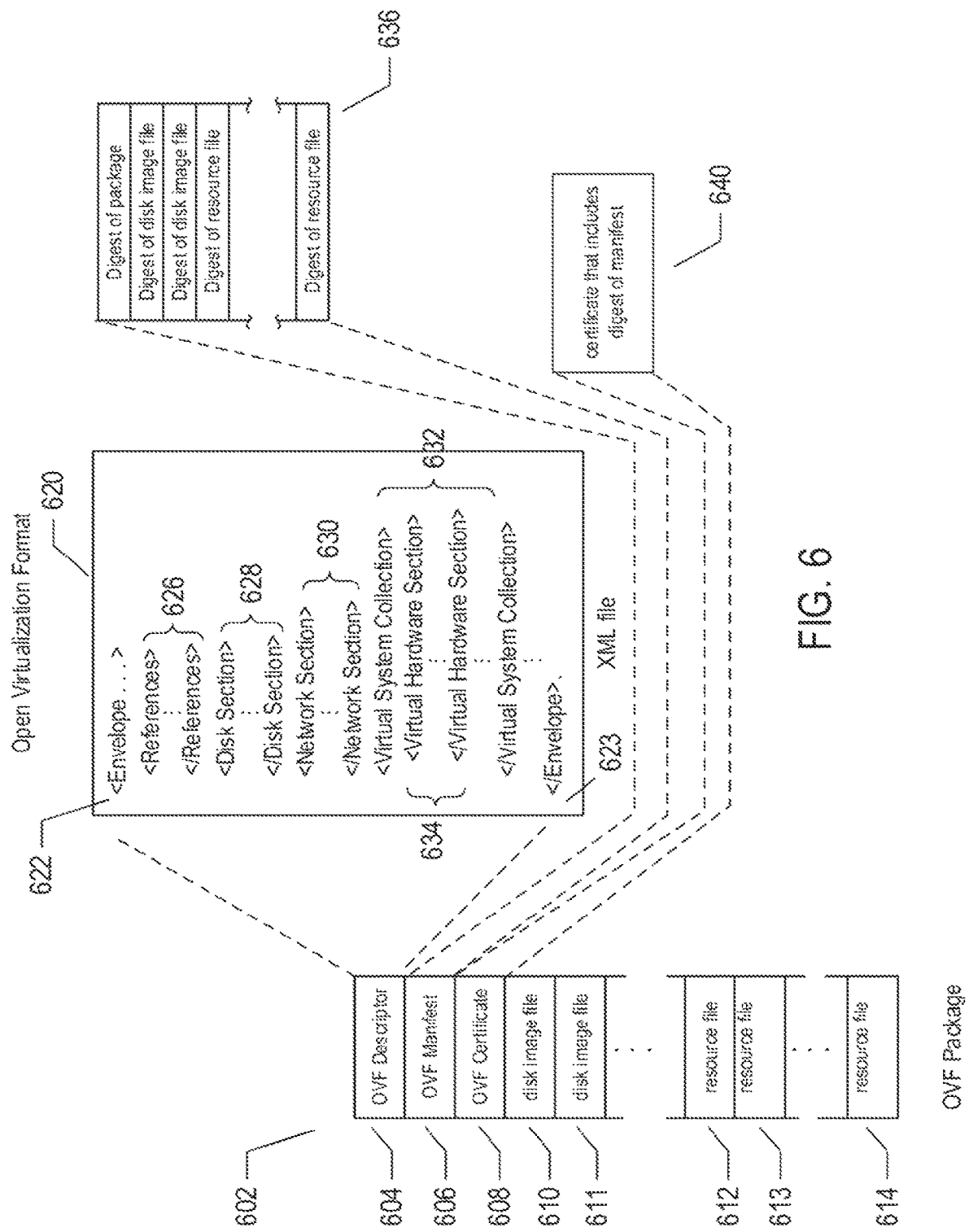
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An CAT package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing. XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
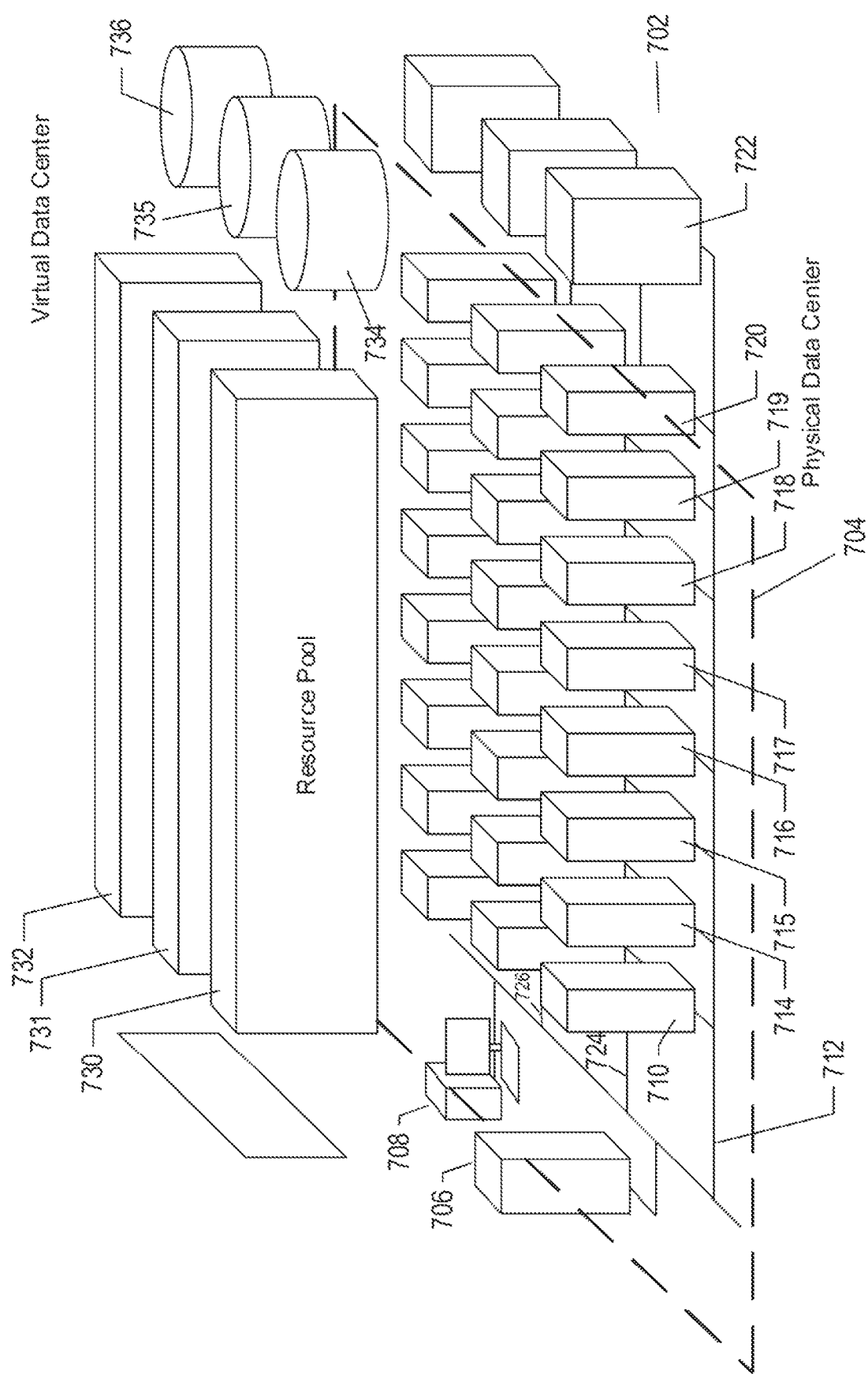
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708 on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple VMs. Different physical data centers may include many different types of computers, networks, data-storage systems and devices connected according, to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of physical servers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server 706 includes functionality to migrate running VMs from one physical server to another in order to optimally or near optimally manage device allocation, provide fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual physical servers and migrating VMs among physical servers to achieve load balancing, fault tolerance, and high availability.

Figure 8:
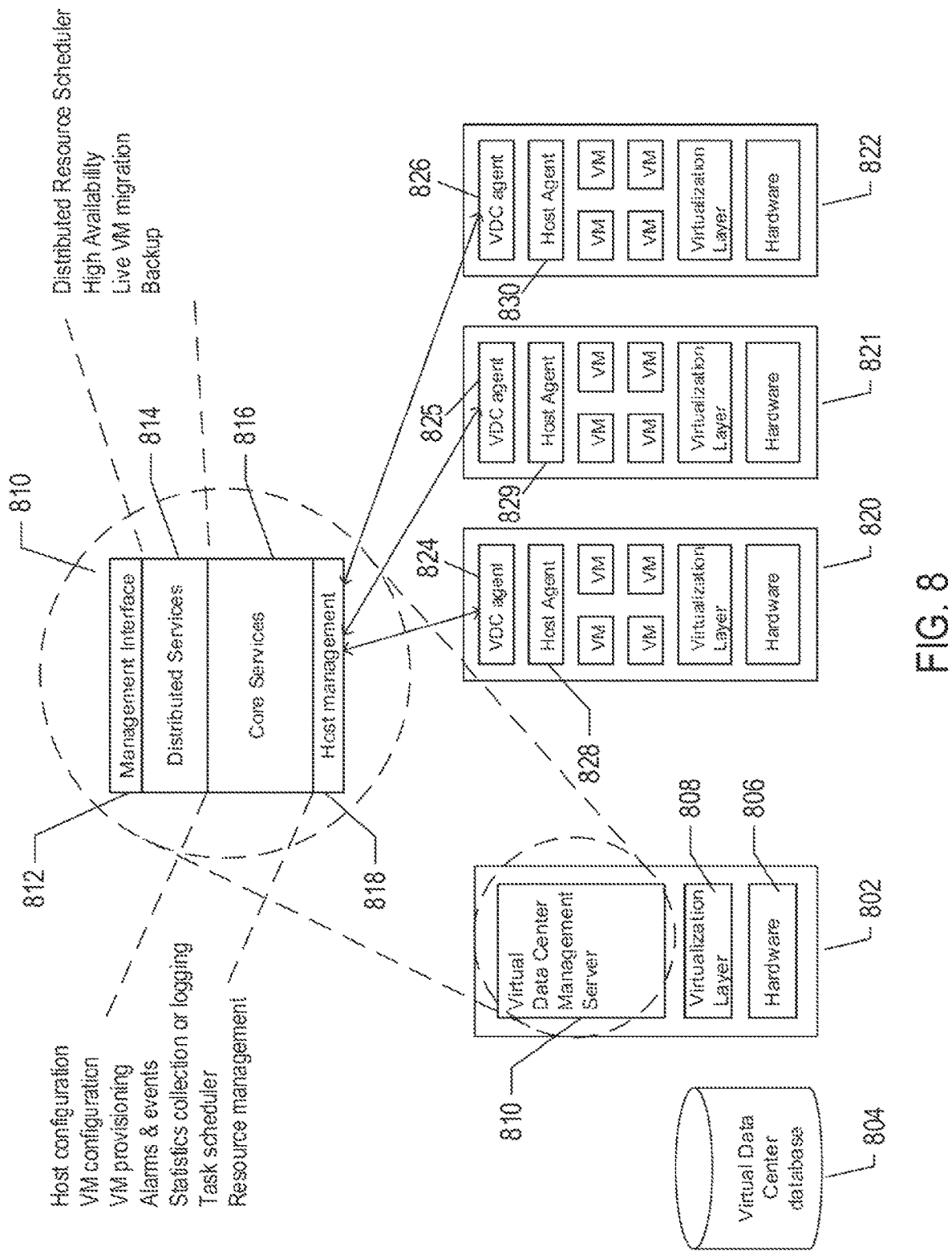
FIG. 8 shows virtual-machine components of a virtual-data-center management server and physical servers of a physical data center.

FIG. 8 shows virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server VM 810 above the virtualization layer. Although shown as a single server in FIG. 8, the virtual-data-center management server ("VDC management server") may include two or more physical server computers that support multiple VDC-management-server virtual appliances. The VM 810 includes a management-interface component 812, distributed services 814, core services 816, and as host-management interface 818. The management interface $18 is accessed from any of various computers, such as the PC 708 shown in FIG. 7. The management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the physical servers of the physical data center that is abstracted to a virtual data center by the VDC management server.

The distributed services 814 include a distributed-device scheduler that assigns VMs to execute within particular physical servers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server, and restarts the VM on the different physical server from a virtual-machine state recorded when execution of the VM was halted. The distributed services 814 also include a distributed backup service that provides centralized virtual-machine backup and restore.

The core services 816 provided by the VDC management server 810 include host configuration, virtual-machine configuration, virtual-machine provisioning, generation of virtual-data-center alarms and events, ongoing, event logging and statistics collection, a task scheduler, and a device-management module. Each physical server 820-822 also includes a host-agent VM 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce device allocations made by the VDC management server 810, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides as convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDC:s by a cloud director managing the multi-tenancy layer of abstraction within a cloud-computing facility. The cloud services interface (308 in FIG. 3) exposes a virtual-data-center management interface that abstracts the physical data center.

Figure 9:
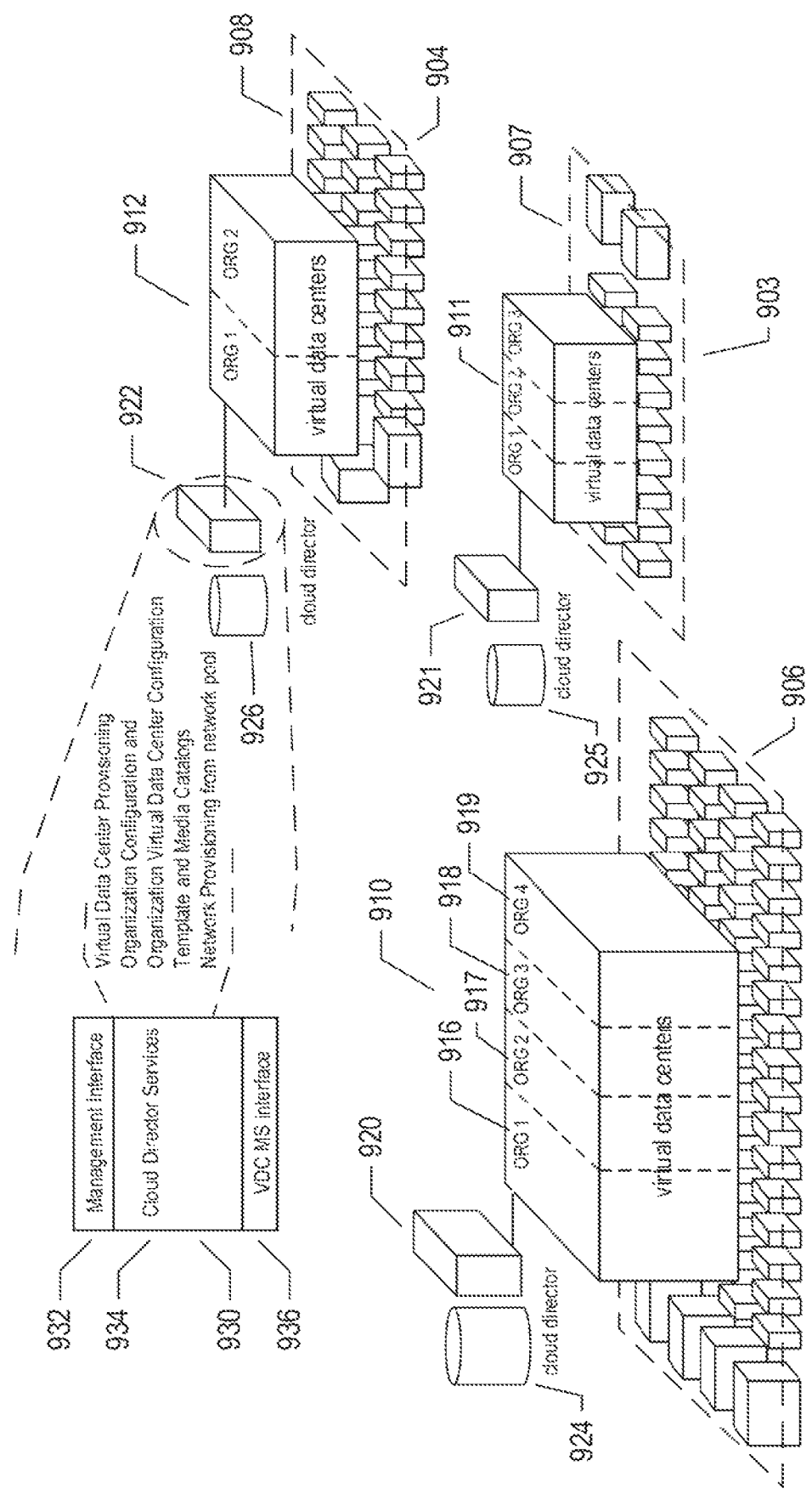
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging: new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
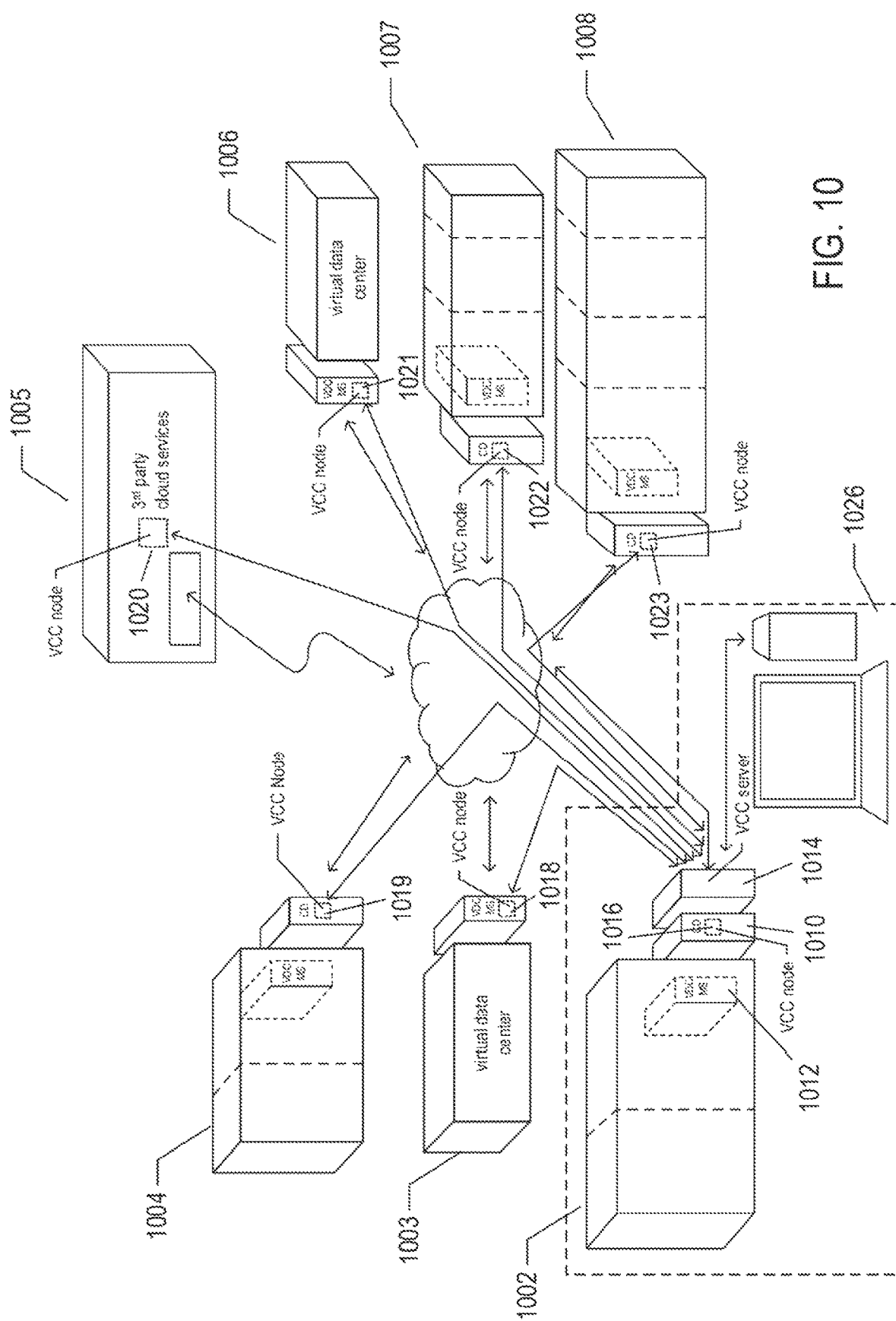
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal. PC, or other computer system 1026 to allow a cloud-aggregation administrator or other use to access VCC-server-provided aggregate-cloud distributed services. In general, the cloud-computing facilities that together form a multiple-cloud-computing aggregation through distributed services provided by the VCC server and VCC nodes are geographically and operationally distinct.

Methods to Determine Application License Costs in Virtualized Data Centers

Figure 11A:
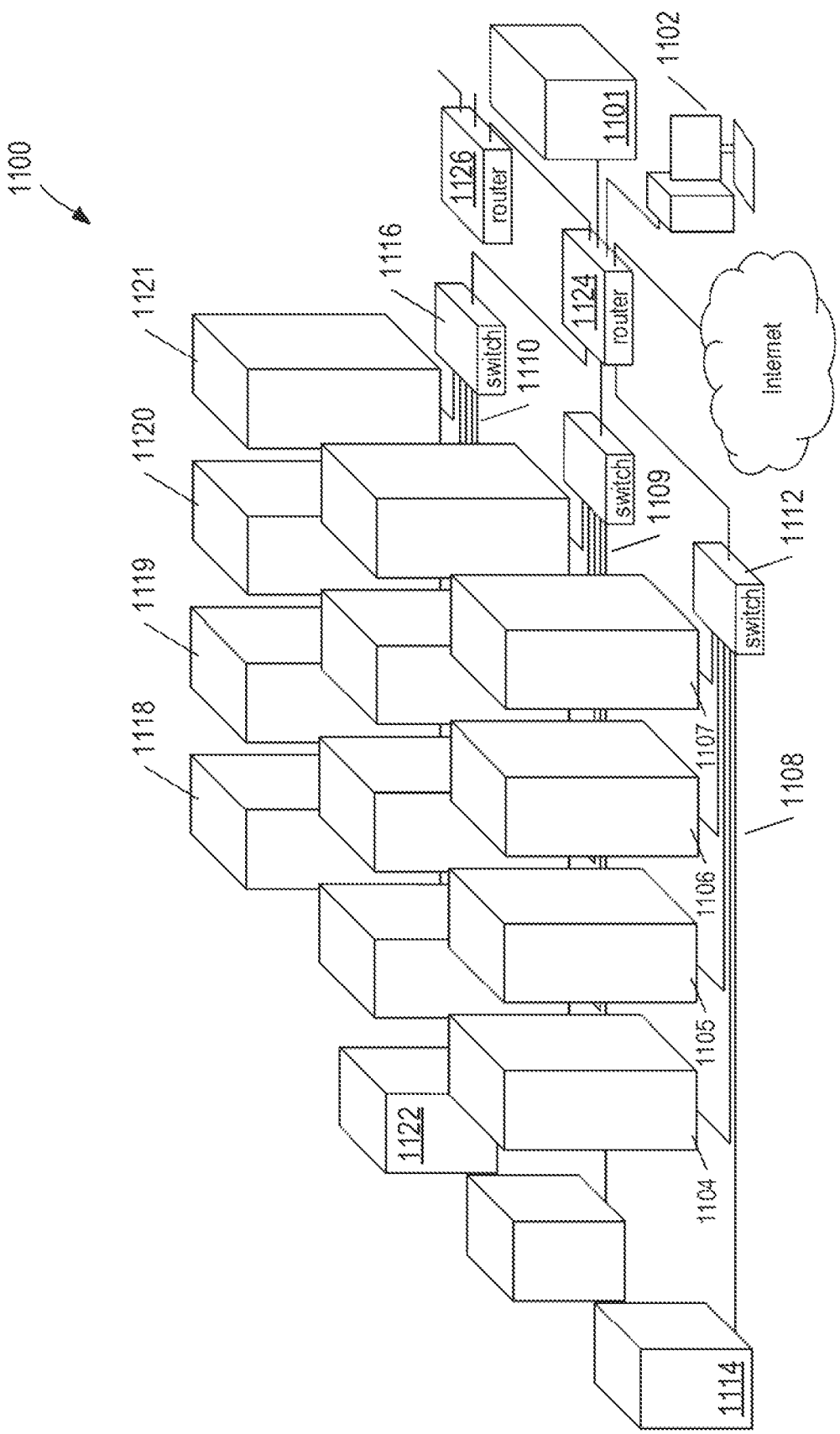
FIG. 11A shows an example of a physical data center.

FIG. 11A Shows an example of a physical data center 1100. The physical data center 1100 consists of a virtual-data-center management server 1101 and a PC 1102 on which a virtual-data-center management interface may be displayed to system administrators and other users. The physical data center 1100 additionally includes a number of hosts or server computers, such as server computers 1104-1107, that are interconnected to form three local area networks 1108-1110. For example, local area network 1108 includes a switch 1112 that interconnects the four server computers 1104-1107 and a mass-storage array 1114 via Ethernet or optical cables and local area network 1110 includes a switch 1116 that interconnects four server computers 1118-1121 and a mass-storage array 1122 via Ethernet or optical cables. In this example, the physical data center 1100 also includes a router 1124 that interconnects the LANs 1108-1110 and interconnects the LANs to the Internet, the virtual-data-center management server 1101, the PC 1102 and to a router 1126 that, in turn, interconnects other LANs composed of server computers and mass-storage arrays not shown), in other words, the routers 1124 and 1126 are interconnected to form a larger network of server computers.

Figure 11B:
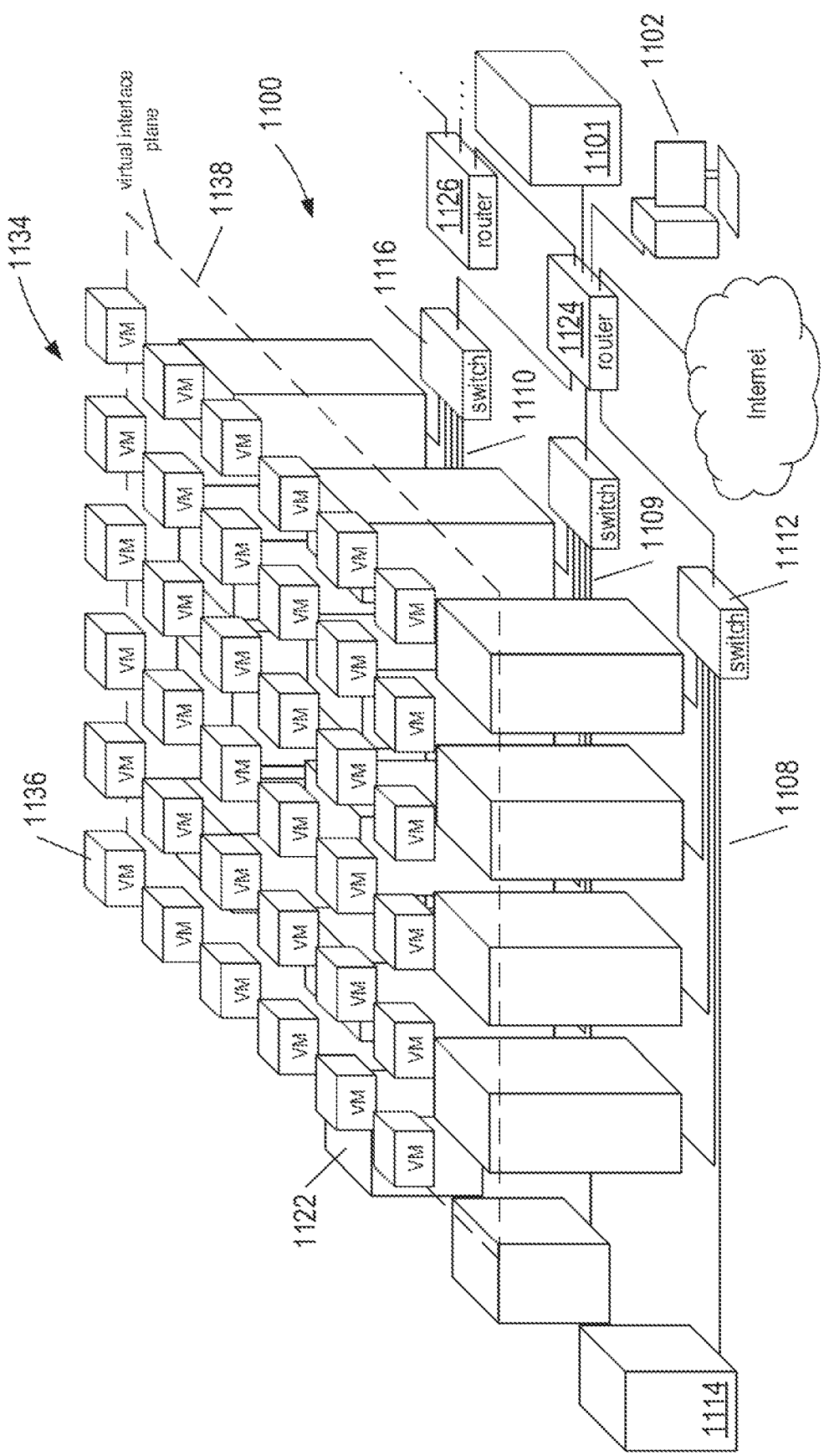
FIG. 11B shows an example of thirty-six virtual machines above a virtual interface plane of the physical data center shown in FIG. 11A.

The server computers of the physical data center 1100 form a cluster of host computers for a tenant's VDC. FIG. 11B shows an example of a VDC composed of thirty-six VMs 1134, such as VM 1136, above a virtual interface plane 1138. The VMs 1134 may be partitioned to run on different servers and because the VMs are not bound physical devices, the VMs may be moved to different servers in an attempt to maximize efficient use of the physical data center 1100 resources. For example, the thirty-six VMs 1134 may be partitioned so that each server runs three VMs. Alternatively, because certain VMs may have much larger computational workloads than other VMs, the VMs may be distributed based on the workload associated with each VM. For example, certain server computers may serve as hosts for one or two VMs while other server computers may serve as host computers for three or more VMs.

One or more applications may be installed in VMs that are created in accordance with application blueprints. For example, consider a set of two or more applications. Suppose each application has an associated application blueprint, which is a model or plan of how the application and/or application components should be implemented on a computer platform and describes the type of operating system ("OS") used to run the application. In particular, an application blueprint may state that components of an associated application should be executed on particular hardware components. An application blueprint may describe the hardware components as including a particular number of processors, type of processors, amount of memory, network interface, data-storage volume, and a particular OS. The application blueprints are input to an application director that, based on the parameters described in the application blueprints, designs and customizes a set of one or more VMs that are each separately configured to provide a computing platform for the applications associated with the application blueprints. For example, each VM may be configured with a particular number of virtual CPUs ("vCPUs") and amount of virtual memory based on one or more blueprints. The application director may also provision data-center hardware in order to deploy the VMs over a number of server computers. The VMs created to run the applications form a VDC.

Figure 12A:
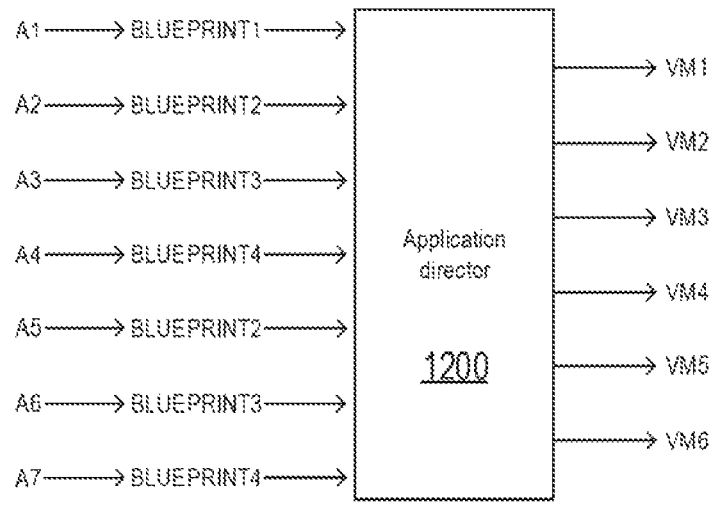
FIGS. 12A-12B show examples of an application director that receives as input blueprints associated with seven applications and outputs six virtual machines to run the applications.
Figure 12B:
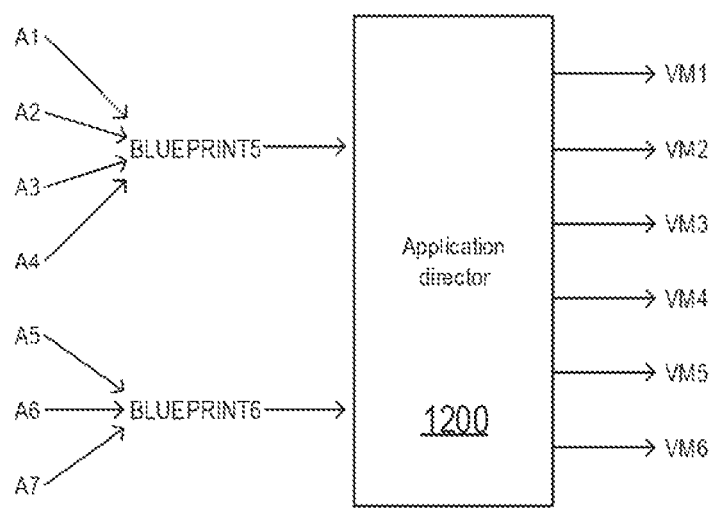

FIGS. 12A-12B shows examples of an application director 1200 that receives blueprints associated with a set of seven applications denoted by A1, A2, A3, A4, A5, A6, and A7 and outputs six VMs to run the applications. In the example of FIG. 12A, each of the applications A1, A2, A3, A4, A5, A6, and A7 has an associated application blueprint that describes application details such as the application name, type, and vendor and describes a model or plan of the computer platform and OS the application should be run on. For example, BLUEPRINT1 describes a model of a computer platform and OS the application A1 should be run on. In the example of FIG. 12B, a single blueprint BLUEPRINT5 describes details regarding the applications A1, A2, A3, and A4, and a siratle BLUEPRINT6 describes details regarding applications A5, A6, and A7, in both examples, the application director 1200 receives the blueprints as input and generates six separate VMs denoted by VM1, VM2, VM3, VM4, VM5, and VM6 that form a VDC to run the seven applications A1, A2, A3, A4, A5, A6, and A7.

Figure 13:
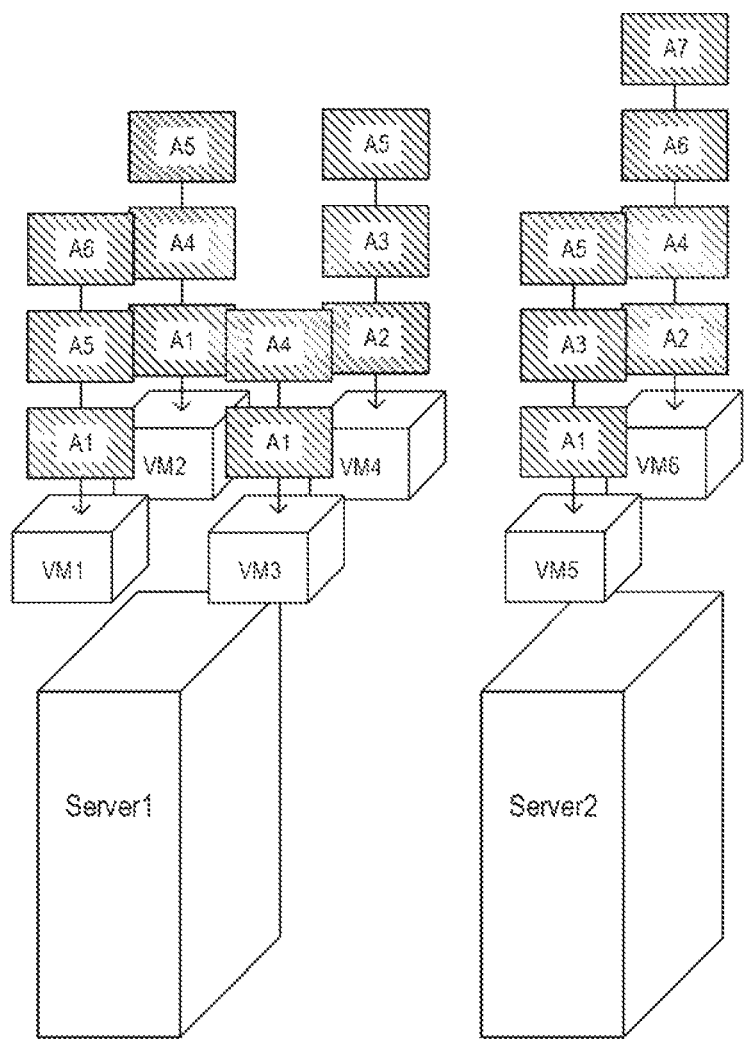
FIG. 13 shows an example of deploying virtual machines across two servers of a data center.

FIG. 13 shows an example of deploying the six VMs across two servers of a data center. In this example, VM1, VM2, VM3, and VM4 are run on Server1 and VM5 and VM6 are run on Server2. FIG. 13 also shows an example of how the seven applications are distributed across the VMs. For example, VM1 is designed to run applications A1, A5, and A6 and VM3 is designed to run applications A1 and A4. Note that certain applications, such as application A1, are run on more than one VM while other applications, such as application A7, are run on a single VM, which may be determined from the hardware specifications in the blueprints. For example, the hardware specifications in BLUEPRINT1 for the application A1 may specify a much higher demand for hardware resources than BLUEPRINT 7 for the application A7.

Methods to compute application license cost are now described. Application blueprints may be searched to identify details about the applications running in a VDC and the VMs created to run the applications. The association of application blueprints to VMs is maintained by data-center management tools. The management tools manage heterogeneous cloud platforms and provide details of blueprints used to provision applications over the VMs. The management tools also maintain specific properties modified by a user for a provisioned instance. Another approach to identify details about the applications is to search the applications running on the VMs using application discovery tools. Business tools running in the data center may be used to obtain infrastructure cost of the VMs provisioned according to the blueprints. Other business enterprise tools running in the data center have the capability of importing a tenant's general ledger and other enterprise systems data. Each tenant has a general ledger the cloud computing facility uses to determine the cost of running the tenant's VMs in the facility. The general ledger may list the application names, license types, and license costs. Once the applications running in the VMs have been identified from the application blueprints, the general ledger business enterprise tools may be used to search the general ledger to identify the license type and license cost of each application.

Figure 14:
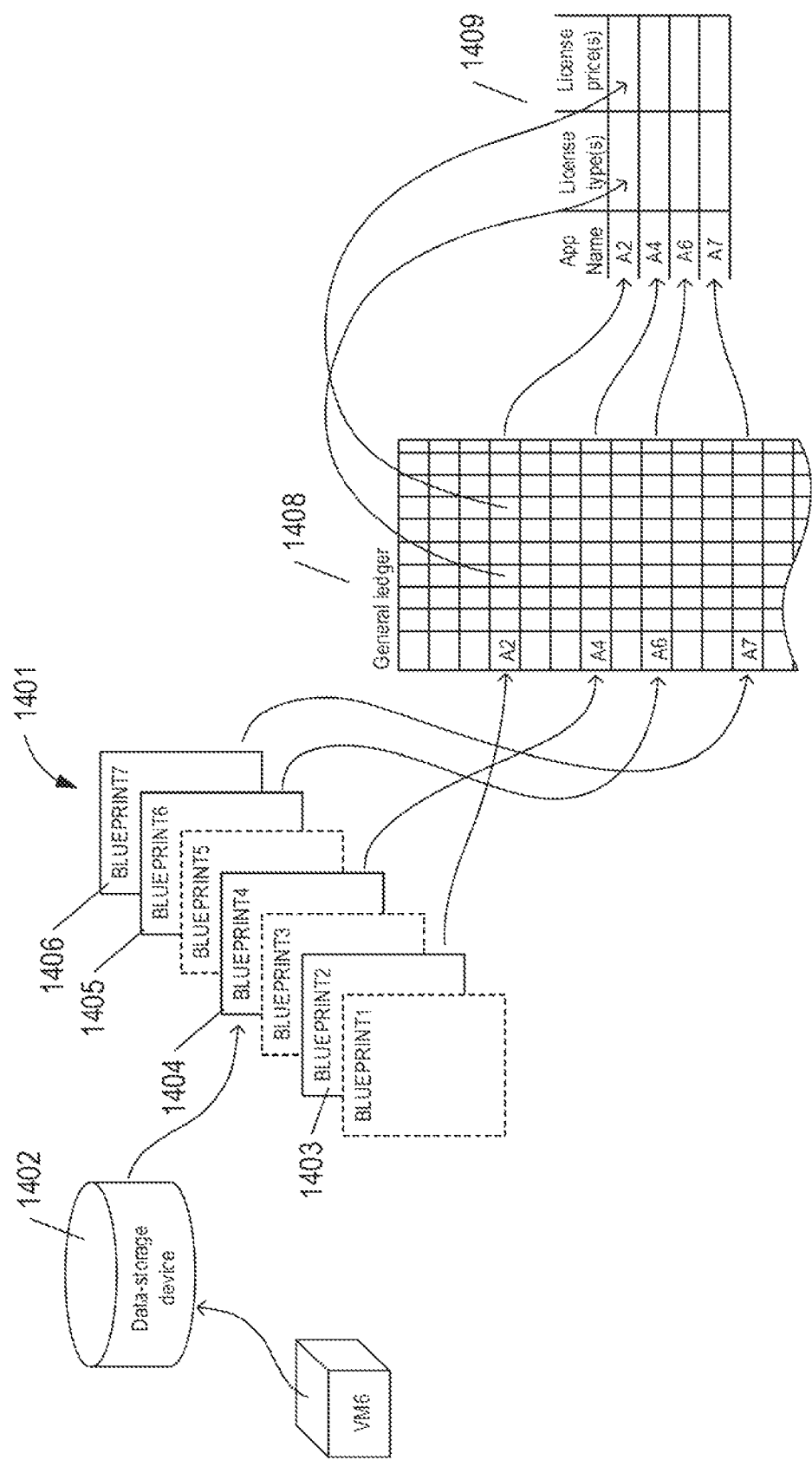
FIG. 14 shows an example of determining license type and cost associated with applications running in example virtual machine.

FIG. 14 shows an example of determining license type and cost associated with the applications running in example VM6. The application blueprints 1401 used to create the six VMs are stored in a data-storage device 1402. In this example, the seven application blueprints 1401 are searched using a data search tool in order to identify the application blueprints 1403-1406 used to create VM6 and from the application blueprints 1403-1406 identify the corresponding applications A2, A4, A6, and A7 that run on VM6, as described above with reference to FIG. 13. A general ledger 1408 associated with the tenant may also be stored in the data-storage device 1402 and searched using the same or a different data search tool to collect licensing details 1409 regarding the licensing types and costs associated with each of the applications A2, A4, A6, and A7.

The license types and costs are collected for each of the applications running the six VMs. The kinds of application license types include an instance license, a core license, and a socket license. A vCPU license is a type of instance license based on the number of vCPUs a VM used to run the application. A user license is also a type of instance license based on the number of users that use an application. A core license is based on the number of processor cores used to run the application, and a socket license is based on the number of sockets used to run the application. Certain applications may have one or more license types and each license type may have a different associated license cost.

FIG. 15 shows an example data table of license types and costs of the example applications running in each of the six example VMs. Column 1501 list the applications run by each of the VMs. Columns 1502-1505 list the four license types: vCPU license, user license, core license, and socket license. Letters in table cells represent license costs and blank table cells indicate that the application license does not include the associated license type. For example, table cell 1506 has an entry, b, that represents the application A1 license cost per core. The application A1 does not have another license type. In other words, the application A1 has a single license type, a core license, and the license cost per core is b. On the other hand, table cells 1507 and 1508 have entries q and r, respectively. The application A5 has a user license with a license cost of q per user and a core license with a license cost of r per core.

The total application license cost of each VM of a VDC is computed as follows. Consider a VDC composed of M VMs, Let N represent the number of applications that run on a VM. Of the N applications, $N_I$ may have instance licenses, $N_C$ may have core licenses, and $N_S$ may have socket licenses. It should be noted that $N_C+N_C+N_C \geq N$, because certain applications may have more than one license type each with an associated license cost. It should also be noted that N, $N_I$, $N_C$, and $N_S$ may be different for each VM.

For applications with instance licenses, the application instance license cost of running one or more applications with $N_I$ instance licenses on the m-th VM is given by:

$$VMAppInstLicCost_m = \sum_{i=1}^{N_I} AppCost_i \times MultFactor_i \quad (1)$$

where
subscript "m" is the VM subscript;

$AppCost_i$ is an instance-based license of the i-th application; and $MultFactor_i$ is a multiplying factor.

The $AppCost_i$ may be the license cost per vCPU or $AppCost_i$ may be license cost per user. In cases where a single application has two or more instance licenses, the instance license cost may calculated as an average:

$$AppCost_i = \frac{1}{n_i} \sum_{j=1}^{n_i} AppCost_{ij} \quad (2)$$

where $n_i$ is the number of instance licenses associated with the i-th application.

The multiplying factor $MultFactor_i$ typically has a default value of 1. When the instance license is based on the number of vCPUs, the multiplying factor is the number of vCPUs configured for the VM. When the instance license is based on the number of users, the multiplying factor is the number of users the application is configured to be available for. In certain cases, the multiplying factor may be assigned a value less that one based on the CPU vendor. For example, the multiplying factor may be assigned a value of 0.75 instead of 1 for certain CPU vendors.

For applications with a core license, the application license cost of running one or more applications with core licenses in the m-th VM is computed as follows. First, for a core license, a host application license cost is calculated for each of the applications running on the VM as follows:

$$HostAppCoreLicCost_i = AppLicCostperCore_i \times NumCores \quad (3)$$

where
AppLicCostperCore is the i-th application license cost per core; and

NumCores is the total number of physical cores provided by the host or server computer to the VM to run the application.

Note that NumCores is less than or equal to the number of physical cores on the host or server computer. The application license cost of running one or more applications with $N_C$ core licenses on the m-th VM is as follows:

$$VMAppCoreLicCost_m = \sum_{i=1}^{N_C} HostAppCoreLicCost_i \times CPUProportion_{xi} \quad (4)$$

The VM application core license cost is divided proportionately among on the other VMs that also run the application on the same host. The CPU proportion, $CPUProportion_{xi}$, is a proportion factor of the number of vCPUs configured for the VM divided by the total number of vCPUs of the VMs that run the i-th application on the same host.

For applications with a socket license, the application license cost of running one or more applications with socket licenses in a VM is computed as follows. First, for a socket license, a host application license cost is calculated for each of the applications running on the VM as follows:

$$HostAppSocketLicCost = AppLicCostperSocket_i \times Numsockets \quad (5)$$

where
$AppLicCostperCore_i$ is the i-th application license cost per socket; and NumSockets is the total number of sockets provided by the host or server computer.

The application license cost of running one or more applications with $N_S$ socket licenses on the m-th VM is as follows:

$$VMAppSocketLicCost_m = \sum_{i=1}^{N_S} HostAppSocketLicCost_i \times CPUProportion_{xi} \quad (6)$$

The total application license cost for running applications with $N_I$ instance licenses, $N_C$ core licenses, and $N_S$ socket licenses on the m-th VM is calculated by summing the results of Equations (1), (4), and (6) as follows:

$$TotalVMAppLicCost_m = VMAppInstLicCost_m + VMAppCoreLicCost_m + VMAppSocketLicCost_m \quad (7)$$

The total application license costs of the VDC is calculated as follows:

$$TotalAppLicCost = \sum_{m=1}^{M} TotalVMAppLicCost_m \quad (8)$$

It should be noted that application licenses may distinguish between physical processors that use hyper-threading from physical processors that do not use hyper-threading. For example, an OS may address two or more virtual cores of a processor that uses hyper-threading. In cases where a physical processor is configured to provide hyper-threading, the number of cores, NumCores, is multiplied by the number of virtual cores associated with the physical processor and the number of sockets. Numsockets, is multiplied by the number of virtual sockets associated with the virtual cores.

Methods may also include computing the wastage for each VM as follows:

$$Wastage = \sum_{i=1}^{N} (AppLicCostPaid_i - ActualUtilLicCost_i) \quad (9)$$

where
AppLicCostPaid$_i$ is the application license cost the tenant paid for the i-th application license; and
ActualUtilLicCost$_i$ is the actual utilization license cost of the i-th application computed as follows:

$$ActualUtilLicCost_i = (AppCost_i \times MultFactor_i)HostAppCoreLicCost_i + HostAppSocketLicCost_i \quad (10)$$

The application license cost paid may be determined from tenant billing statements. If the wastage is greater than a wastage threshold (i.e., Wastage>$T_w$, where $T_w$ is a wastage threshold), an alert may be generated which indicates that a tenant is paying more than an acceptable cost for actual usage of the applications.

Figure 16A:
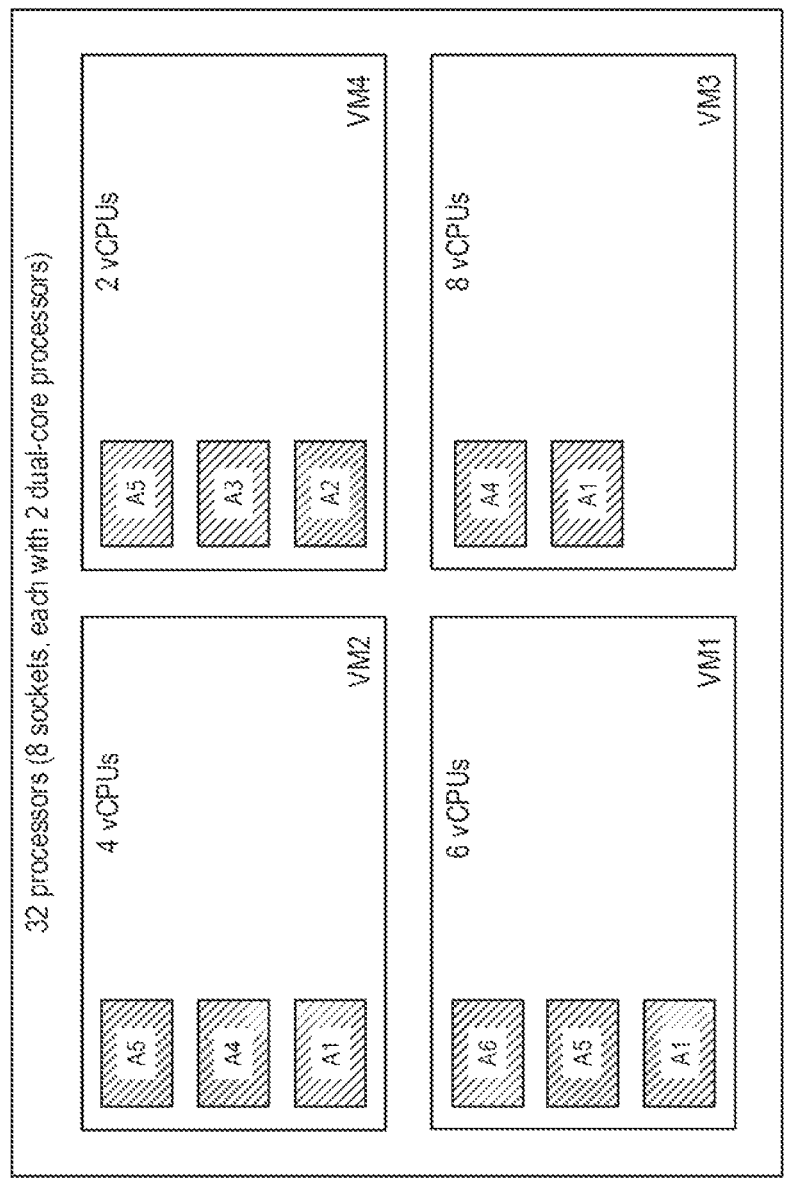
FIG. 16A shows an example of computing virtual machine application license costs for four virtual machines running on a server.

FIG. 16A shows an example of computing VM application license costs for each of the four VMs running on server 1 shown in FIG. 13. In this example, server 1 has 32 dual-core processors and 8 sockets, each socket containing, two dual-core processors (i.e., each socket contains four core processors). The total VM application license costs for each of the four VMs are calculated according to Equations (1)-(7) based on the license types and license costs displayed in the example data table of FIG. 15. The total VM application cost for each of the VMs are given as follows:

VM1: $TotalVMAppLicCost_1 = 32b\frac{1}{3} + 32r\frac{1}{2} + q + 6s$

VM2: $TotalVMAppLicCost_2 = 32b\frac{2}{9} + 4g + h + 8m\frac{1}{2} + q + 32r\frac{1}{3}$ VM3: $TotalVMAppLicCost_3 = 32b\frac{4}{9} + 8g + h + 8m\frac{2}{3}$ VM4: $TotalVMAppLicCost_4 = c + 2e + 8f + q + 32r\frac{1}{6}$ For example, consider calculation of the total VM application license cost of running the applications A1, A5, and A6 in VM1, shown in FIG. 16. The application A1 runs on VM1, VM2, and VM3, which have 6 vCPUs, 4 vCPUs, and 5 vCPUs, respectively. The host application core license cost is 32 b and the CPU proportion factor is ⅓ (i.e., 6/(6+4+8)). The VM application core license cost of A1 is 32 b/3. The application A5 runs on VM1, VM2, and VM4, which have 6 vCPUs, 4 vCPUs, and 2 vCPUs . . . , respectively. The host application core license cost is 32 r and the CPU proportion factor is ½ (i.e., 6/(6+4+2)). The VM application core license cost of A5 is 32 r/2. The application A5 also has a user license cost of q, and the application A6 has a vCPU license cost of 6 s. The license cost of the separate license types are summed to obtain the total VM1 application license cost of 32 b/3+32 r/2+q+6 s.

Data center tenants may purchase Enterprise License Agreements ("ELAs") spanning a number of years and unlimited usage. However, in practice no one may actually know how many of the applications covered by the ELA's are being used. With computation of application licensing cost as described above, a tenant be able to identify which of the licensed applications and how many instances of the applications are running in the physical data center. By using application licensing benchmarking data, the licensing cost of all the running applications may be computed, including the number of instances of buying individual licenses. For example, consider a tenant that purchased an ELA for an application A with at a cost C1. However, only four VM's in the current data center are running the application A over a monitored period of time (e.g., quarterly or annually). If a tenant has to buy one license for four instances and the cost is C2 (i.e, 4 times individual license cost obtained from reference database). If the cost C2 is less than C1, method described above can be used to recommend that the tenant purchase individual licenses rather than an ELA.

As described above, certain license cost are based on the number of CPU sockets and number of cores. However, it may be the case that certain VMs running the same applications are spread across various hosts. In such cases even if a small workload VM is running such an application, the VM creates licensing cost for all CPU sockets/cores in the host running the VM. Significant cost savings may be achieved by placing such VMs on the same host. The same reasoning may be extended to optimize that cost of different applications running on VMs with this kind of licensing agreement in the datacenter.

Figure 16B:
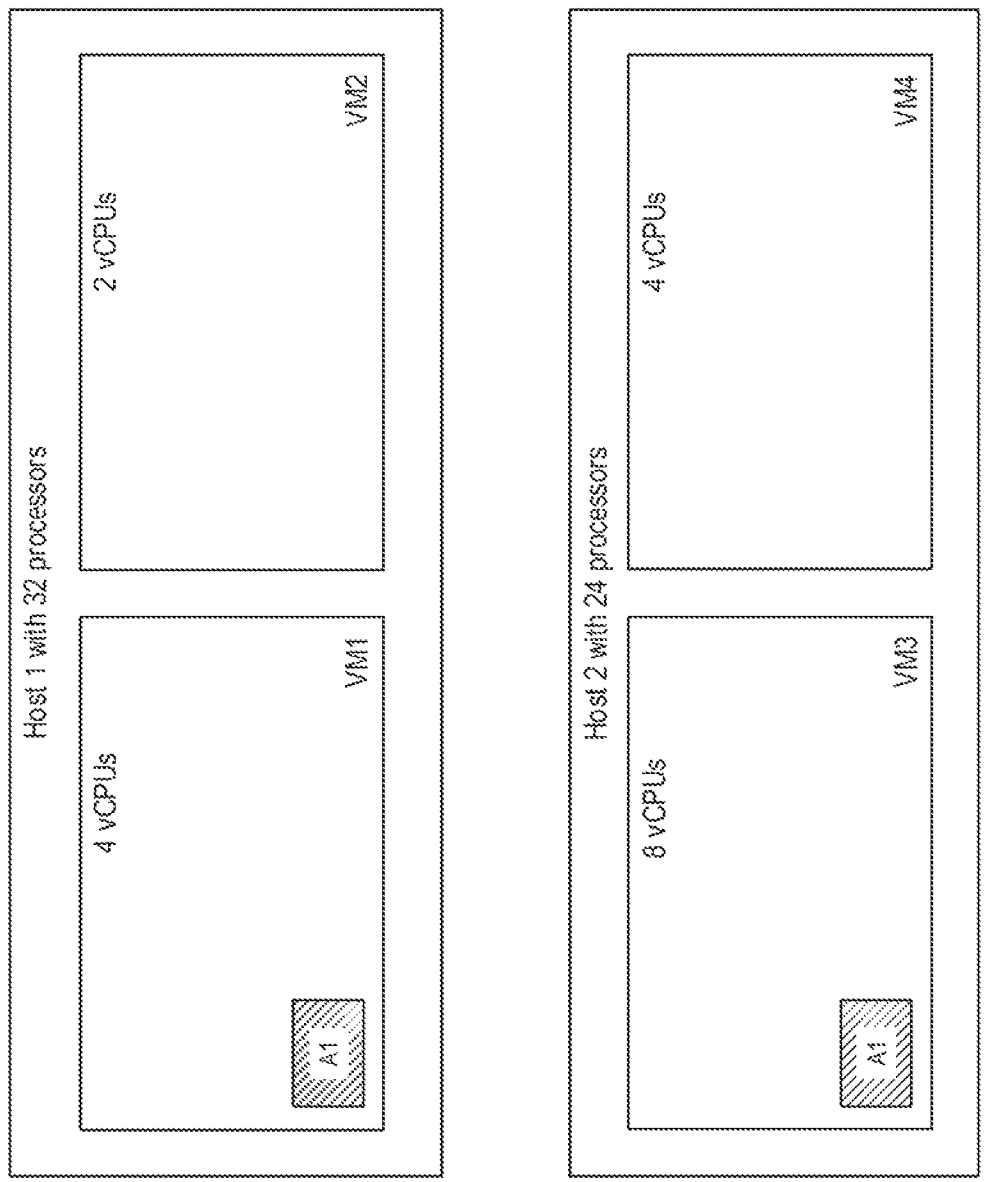
FIG. 16B shows an example of application A1 spread across two host server computers.

FIG. 16B shows an example of application A1 spread across two host server computers Host 1 and Host 2. Note that for the sake of simplicity only the application A1 is considered. The four VMs may run any number of other applications. If the application director does not take into account application licensing cost, the licensing cost for A1 in this example is 32 b+24 b. On the other hand, the application licensing cost may be calculated for different scenarios. For example, VM1 and VM3 may be calculated in advance for Host1 as 32 k and for Host2 as 24 k. As a result, running VM1 and VM3 on Host2 would appear to create a cost savings.

The data center may use a distributed resource scheduler ("DRS") to move one or more VMs from one server computer to another server computer in order to achieve a workload balance. When an application license is based on cores or sockets, the DRS is aware of the server computers running the VMs. When DRS runs, the application core and socket license costs may be additional factors in determined whether or not to move VMs. For example, if the application core or socket license cost would increases as a result of moving a VM from one server computer to a different server computer, then the VM may not be moved. Alternatively, if the application core or socket license cost would decreases as a result of moving a VM from one server computer to a different server computer, then the VM may be moved Distributed power management ("DPM") consolidates the VM workloads to a few server computers if the computational capacity is available and powers off unused server computers in the datacenter to save power or lower facilities costs. However, this operation may lead to licensing issues. For example, if the total application license cost would be greater than the power cost as a result of consolidating the VMs, then DPM may avoid consolidating the VMs and/or powering off server computers.

Figure 17:
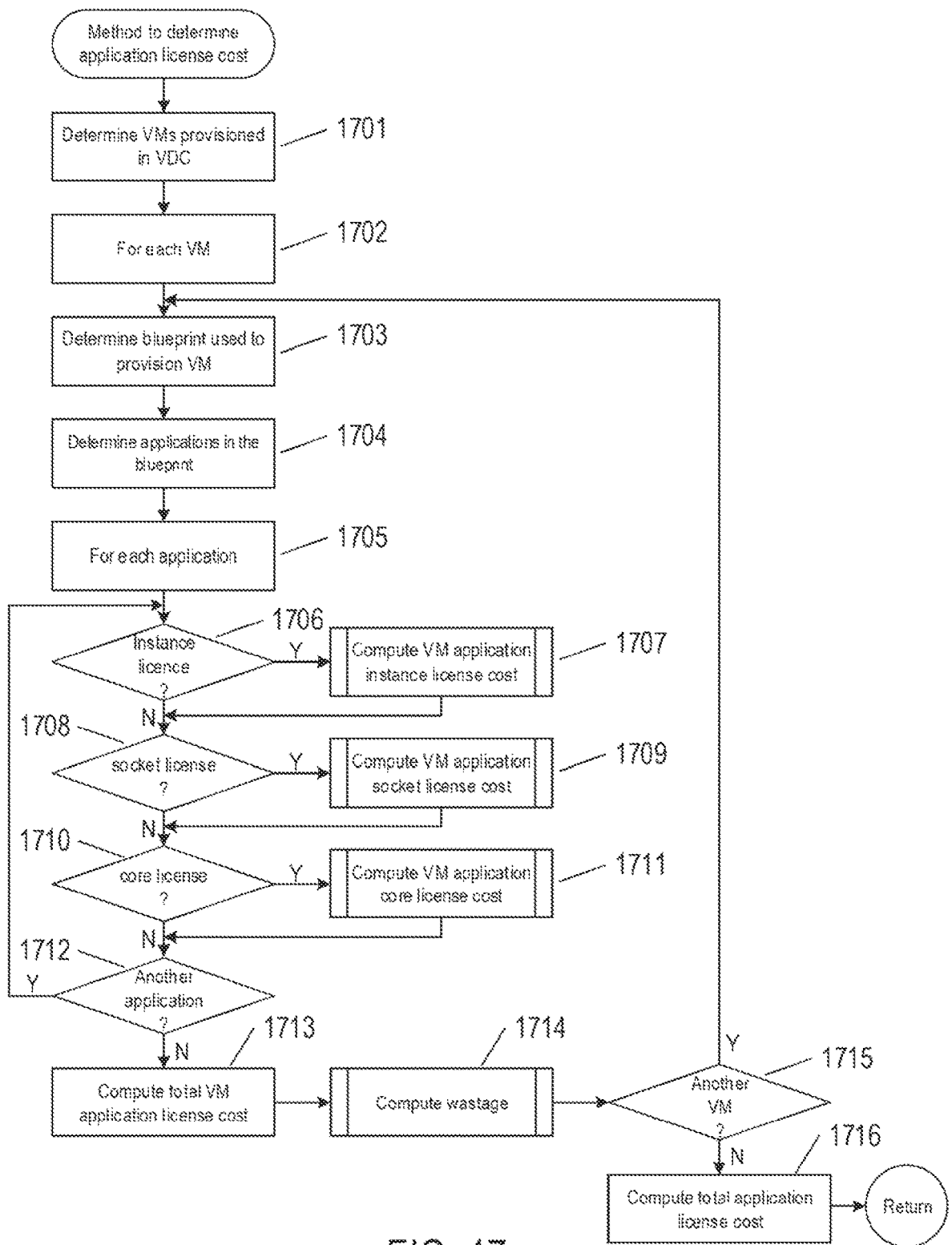
FIG. 17 shows a control-flow diagram of a method to compute application license costs.

FIG. 17 shows a control-flow diagram of a method to compute application license costs. In block 1701, the VMs provisioned to form a VDC are determined. A for-loop beginning with block 1702 repeats the operations represented by blocks 1703-1714 for each VM in the VDC. In block 1703, the blueprints used to generate the VM is determined as described above with reference to FIG. 14. In block 1704, applications associated with the blueprints used to create the VM are identified and license types and license costs associated with the applications are identified from general ledgers or a benchmarking system. A for-loop beginning with block 1705 repeats the operations of blocks 1706-1713 for each application determined in block 1704. In decision block 1706, when one or more of the applications have instance licenses, control flow to the block 1707. Otherwise, control flows to decision block 1708. In block 1707, a routine "compute VM application instance license cost" is called, in decision block 1708, when one or more of the applications have socket licenses, control flows to block 1709. Otherwise, control flows to decision block 1710. In block 1709, a routine "compute VM application socket license cost" is called. In decision block 1710, when one or more of the applications have core licenses, control flows block 1711. In block 1711, a routine "compute VM application core license cost" is called. In decision block 1712, when all the applications that am in the VM have been considered, control flows to block 1713. In block 1713, a total VM application license cost is computed from the VM application instance license cost, the VM application socket license cost, and the VM application core license, as described above with reference to Equation (7). In block 1714, a routine "compute wastage" is called. In decision block 1715, when all VMs of the VDC have been considered, control flows to block 1716. In block 1716, the total application license cost for the VDC is computed as described above with reference to Equation (8).

Figure 18:
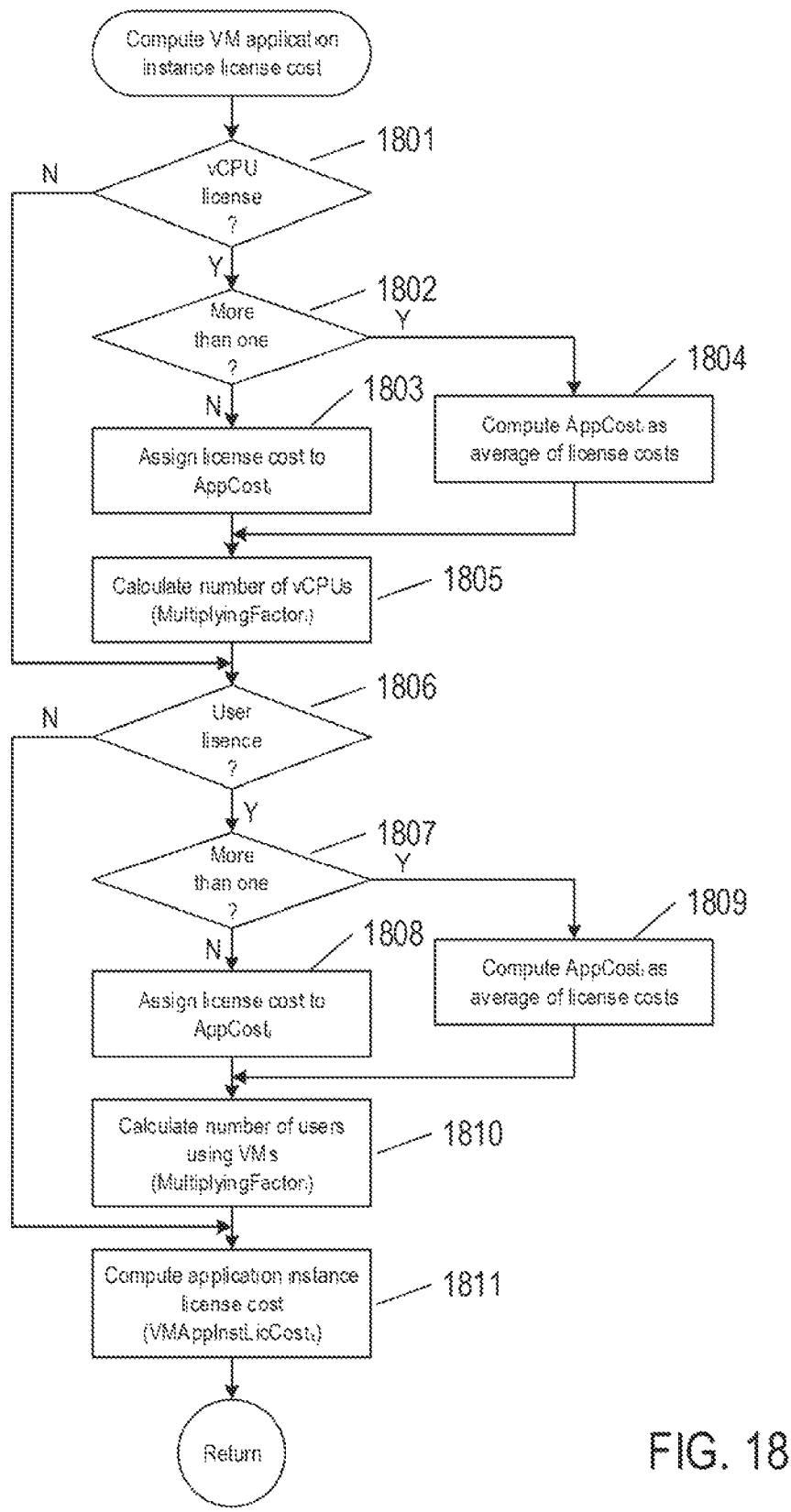
FIG. 18 shows a control-flow diagram of the routine "compute virtual machine application instance license cost" called in FIG. 17.

FIG. 18 shows a control-flow diagram of the routine "compute VM application instance license cost" called in block 1707 of FIG. 17. In decision block 1801, if any of the instance licenses are vCPU licenses, control flows to decision block 1802. Otherwise, control flows to decision block 1806. In decision block 1802, if there is more than one vCPU license, control flows to block 1804, otherwise control flows to block 1803. In block 1803, the vCPU license cost is assigned to AppCost$_i$. In block 1804, the vCPU license costs are averaged to compute AppCost$_i$, as described above with reference to Equation (2). In block 1805, the number vCPUs for the VM are identified. In decision block 1806, if any of the instance licenses are user licenses, control flows to decision block 1807. Otherwise, control flows to decision block 1811. In decision block. 1807, if there is more than one user license, control flows to block 1809, otherwise control flows to block 1808. In block 1803, the user license cost is assigned to AppCost$_i$. In block 1809, the user license costs are averaged to compute AppCost$_i$, as described above with reference to Equation (2). In block 1810, the number users for the VM are identified.

Figure 19:
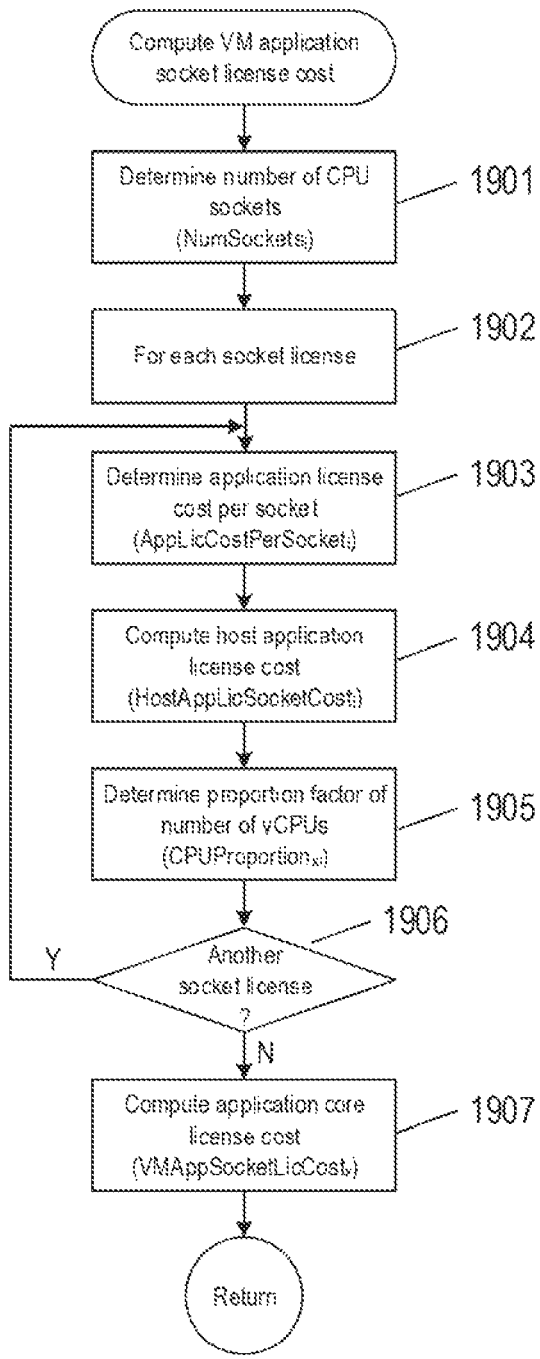
FIG. 19 shows a control-flow diagram of the routine "compute virtual machine application socket license cost" called in FIG. 17.

FIG. 19 shows a control-flow diagram of the routine "compute VM application socket license cost" called in block 1709 of FIG. 17. In block 1901, the number of CPU sockets of the server computer that runs the VM are determined. A for-loop beginning with block 1902 repeats the operations represented by blocks 1903 for each socket license. In block 1903, the application license cost per socket is determined from the general ledger or the benchmarking system. In block 1904, the host application socket license cost is computed as described above with reference to Equation (5). In block 1905, the CPU proportion factor is determined as described above with reference to Equation (6) and FIG. 16. In decision block 1906, when all socket licenses have been considered, control flows to block 1907. In block 1907, the VM application socket license cost is computed as described above with reference to Equation (6).

Figure 20:
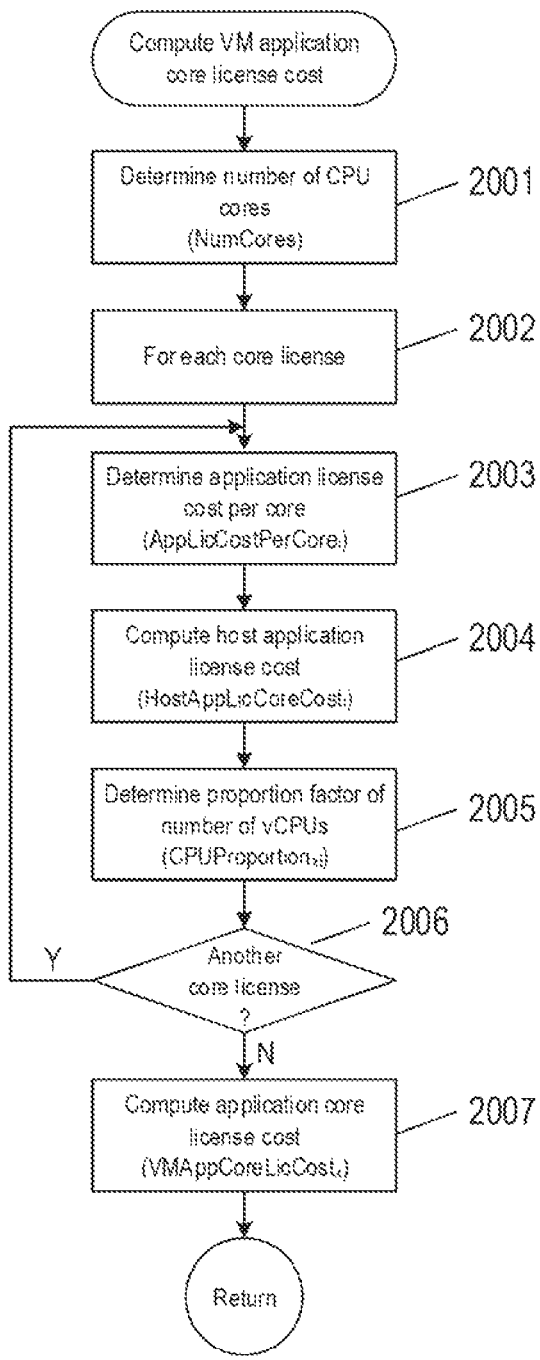
FIG. 20 shows a control-flow diagram of the routine "compute virtual machine application core license cost" called in FIG. 17.

FIG. 20 shows a control-flow diagram of the routine "compute VM application core license cost" called in block 1711 of FIG. 17. In block 2001, the number of CPU cores of the server computer that runs the VM are determined. A for-loop beginning with block 2002 repeats the operations represented by blocks 2003 for each core license. In block 2003, the application license cost per core is determined from the general ledger. In block 2004, the host application core license cost is computed as described above with reference to Equation (3). In block 2005, the CPU proportion factor is determined as described above with reference to Equation (4) and FIG. 16. In decision block 2006, when all core licenses have been considered, control flows to block 2007. In block 2007, the VM application core license cost is computed as described above with reference to Equation (4).

Figure 21:
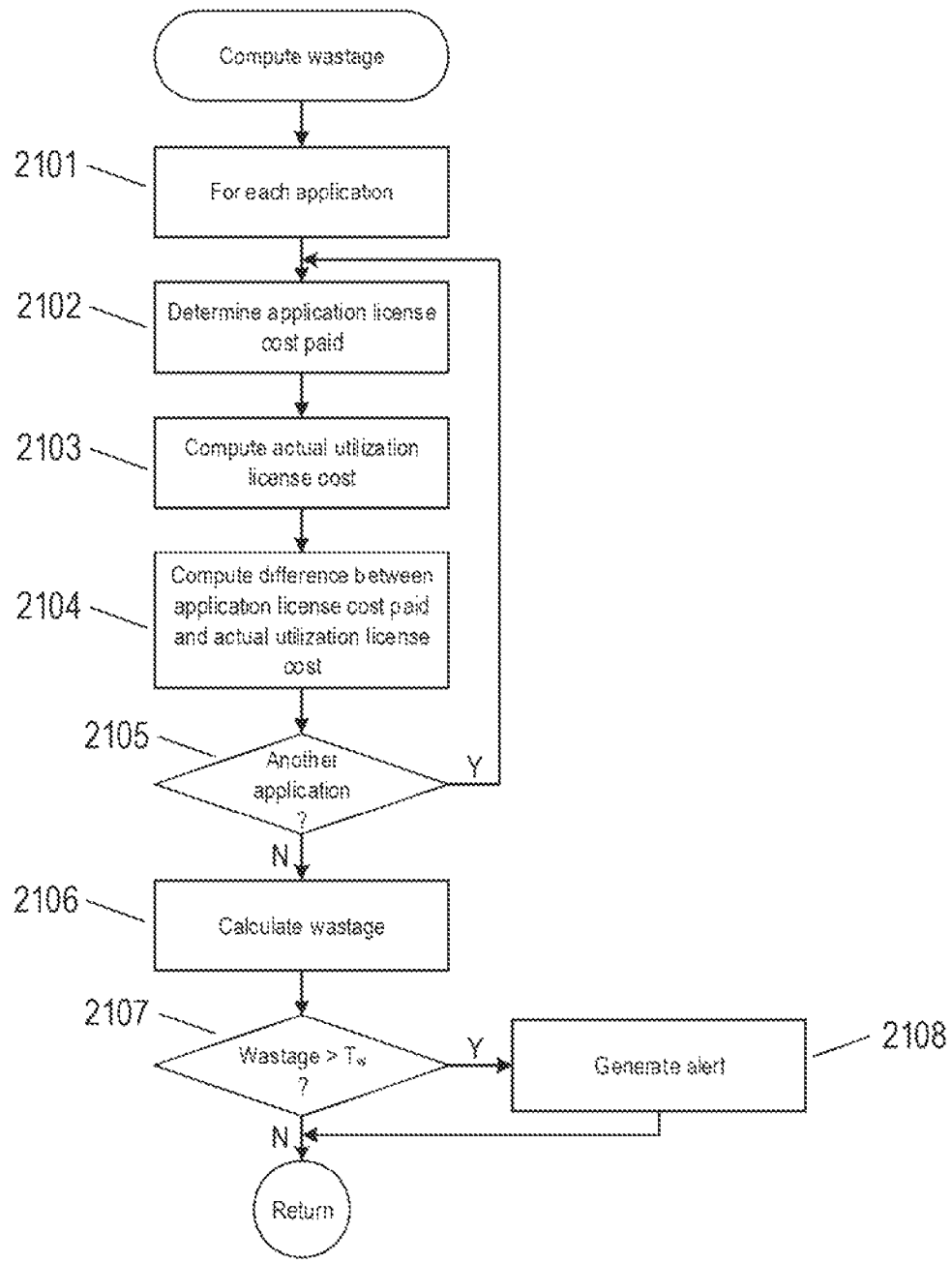
FIG. 21 shows a control-flow diagram of the routine "compute wastage" called in FIG. 17.

FIG. 21 shows a control-flow diagram of the routine "compute wastage" called in block 1716 of FIG. 17. A for-loop beginning with block 2101 repeats the operations represented by blocks 2102 for each application, in block 2102, the amount of each application license cost paid by the tenant is determined. For example, the amounts of each application license cost paid may be determined from tenant billing statements. In block 2103, actual utilization license cost is computed as described above with reference to Equation (10). In block 2104, the difference between the application license cost paid and the actual utilization license cost is computed as the summand in Equation (9). In decision block 2105, when all of the applications have been considered, control flows to block 2106. In block 2106, the differences computed in block 2104 are summed to calculate the wastage as described above with reference to Equation (9). In decision block 2107, when the wastage calculated in block 2106 is greater than a wastage threshold, $T_w$ control flows to block 2108 and an alert is generated.

It is appreciated that the various implementations described herein are intended to enable any person skilled in the art to make or use the present disclosure. Various modifications to these implementations will be readily apparent to those skilled in the art, and the generic principles defined herein may be applied to other implementations without departing from the spirit or scope of the disclosure. For example, any of a variety of different implementations can be obtained by varying any of many different design and development parameters, including programming language underlying operating system, modular organization, control structures, data structures, and other such design and development parameters. Thus, the present disclosure is not intended to be limited to the implementations described herein but is to be accorded the widest scope consistent with the principles and novel features disclosed herein.

What is claimed is:

1. A method stored in one or more data-storage devices and executed using one or more processors of a computing environment to consolidate virtual machines ("VMs") that form a virtual data center to fewer server computers in a physical data center, the method comprising:
   determining virtual machines ("VMs") that form the virtual data center that runs on a number of server computers of the physical data center;
   for each VM,
      determining one or more application blueprints stored in the one or more data-storage devices and used to create the VM,
      determining one or more applications that run in the VM based on the one or more application blueprints, wherein each of the one or more applications is associated with two or more of an application instance license cost, an application socket license cost, and an application core license cost, and
      computing a total VM application licensing cost oil the one or more applications to run on fewer oil the server computers based on the two or more of the application instance license cost, the application socket license cost, and the application core license cost of each of the one or more applications to run on the fewer server computers;
   computing a total application license cost as a sum of the total VM application licensing cost computed for each VM;
   computing a power cost associated with consolidating the VMs onto a consolidated number server computers that is less than the number of server computers;
   determining that a computational capacity of the consolidated number of server computers is available; and
   consolidating the VWs onto the fewer server computers in response to the computational capacity of the fewer server computers being available, and the total application license cost being less than the power cost resulting from consolidating the VMs to the fewer server computers.

2. The method of claim 1, further comprising:
   for each VM,
      computing a wastage of the one or more applications that run in the VM, and
      generating an alert when the wastage is greater than a wastage threshold.

3. The method of claim 2, wherein computing the wastage further comprises:

for each of the one or more applications that run in the VM,
   determining an application license cost paid for each of the one or more applications,
   computing an actual utilization license cost for each of the one or more applications,
   computing a difference between the application license cost paid and the actual utilization license cost; and
   summing the difference for each of the one or more applications to generate the wastage.

4. The method of claim 1, wherein computing the total VM application license cost further comprises:
   for each application of the one or more applications,
      when the application has an instance license, computing the instance license cost based on a number of virtual central processing units ("vCPUs") the VM uses to run the application,
      when the application has a socket license, computing the socket license cost based on a number of sockets of a server computer used to run the VM, and
      when the application has a core license, computing the core license cost based on a number of cores of the server computer used to run the VM.

5. The method of claim 4, wherein computing the instance license cost further comprises:
   for each vCPU license,
      determining a vCPU license cost from a general ledger, and
      determining a vCPU multiplying factor equal to a number of vCPUs the VM uses to run the application;
   for each user license,
      determining a user license cost from the general ledger, and
      determining a user multiplying factor equal to a number of users of the application; and
   summing a product of the vCPU license cost and the vCPU multiplying factor and a product of the user license cost and the user multiplying factor, for each vCPU license and user license.

6. The method of claim 4, wherein computing the socket license cost further comprises:
   determining a number of sockets of processors of the server computer;
   for each socket license of one of the sockets,
      determining application license cost per socket from a general ledger,
      computing a host application license cost as a product of the application license cost per socket and the number of sockets, and
      determining a CPU proportion factor equal to a number of vCPUs used by the VM divided by a total number of vCPUs of the VMs that run the application; and
   summing a product of the host application license cost and the CPU proportion factor for each socket license.

7. The method of claim 4, wherein computing the core license cost further comprises
   determining a number of cores of processors of the server computer;
   for each core license of one of the cores,
      determining application license cost per core from a general ledger,
      computing a host application license cost as a product of the application license cost per core and the number of cores, and determining a CPU proportion factor equal to a number of vCPUs used by the VM divided by a total number of vCPUs of the VMs that run the application; and summing a product of the host application license cost and the CPU proportion for each core license.

8. The method of claim 1, further comprises:

moving one of the VMs from a server computer to a second server computer when one of the application socket license cost and application core license cost is lower for the second server computer; and not moving one of the VMs from a server computer to a second server computer when one of the application socket license cost and application core license cost is higher for the second server computer.

9. The method of claim 1 wherein consolidating the VMs to run on fewer of the number of server computers when the computational capacity of the fewer server computers is available further comprises powering off unused server computers of the number of server computers.

10. A computer system comprising:
one or more processors;
one or more data storage devices; and
machine-readable instructions stored in the data-storage devices and executed using the one or more processors, the machine-readable instructions
determining virtual machines ("VMs") that form a virtual data center that runs on a number of server computers of the physical data center;
for each VM,
determining one or more application blueprints stored in the one or more data-storage devices and used to create the VM,
determining one or more applications that run in the VM based on the one or more application blueprints, wherein each of the one or more applications is associated with two or more of an application instance license cost, an application socket license cost, and an application core license cost, and
computing a total VM application licensing cost of the one or more applications to run on fewer of the server computers based on the two or more of the application instance license cost, the application socket license cost, and the application core license cost of each of the one or more applications to run on the fewer server computers;
computing a total application license cost as a sum of the total VM application licensing cost computed for each VM;
computing a power cost associated with consolidating the VMs onto a consolidated number of server computers that is less than the number of server computers;
determining that a computational capacity of the consolidated number of server computers is available; and
consolidating the VMs onto the fewer server computers in response to the computational capacity of the fewer server computers being available, and the total application license cost being less than the power cost resulting from consolidating the VMs to the fewer server computers.

11. The computer system of claim 10, further comprising:
for each VM,
computing a wastage of the one or more applications that run in the VM, and
generating an alert when the wastage is greater than a wastage threshold.

12. The computer system of claim 11, wherein computing the wastage further comprises:
for each of the one or more applications that run in the VM,
determining an application license cost paid for each of the one or more applications,
computing an actual utilization license cost for each of the one or more applications,
computing a difference between the application license cost paid and the actual utilization license cost; and
summing the difference for each of the one or more applications to generate the wastage.

13. The computer system of claim 11, wherein computing the total VM application license cost further comprises:
for each application of the one or more applications,
when the application has an instance license, computing the instance license cost based on a number of virtual central processing units ("vCPUs") the VM uses to run the application,
when the application has a socket license, computing the socket license cost based on a number of sockets of a server computer used to run the VM, and
when the application has a core license, computing the core license cost based on a number of cores of the server computer used to run the VM.

14. The computer system of claim 13, wherein computing the instance license cost further comprises:
for each vCPU license,
determining a vCPU license cost from a general ledger, and
determining a vCPU multiplying factor equal to a number of vCPUs the VM uses to run the application;
for each user license,
determining a user license cost from the general ledger, and
determining a user multiplying factor equal to a number of users of the application; and
summing a product of the vCPU license cost and the vCPU multiplying factor and a product of the user license cost and the user multiplying factor, for each vCPU license and user license.

15. The computer system of claim 13, wherein computing the socket license cost further comprises:
determining a number of sockets of processors of the server computer;
for each socket license of one of the sockets,
determining application license cost per socket from a general ledger,
computing a host application license cost as a product of the application license cost per socket and the number of sockets, and
determining a CPU proportion factor equal to a number of vCPUs used by the VM divided by a total number of vCPUs of the VMs that run the application; and
summing a product of the host application license cost and the CPU proportion factor for each socket license.

16. The computer system of claim 13, wherein computing the core license cost further comprises
determining a number of cores of processors of the server computer;
for each core license of one of the cores,
determining application license cost per core from a general ledger,
computing a host application license cost as a product of the application license cost per core and the number of cores, and determining a CPU proportion factor equal to a number of vCPUs used by the VM divided by a total number of vCPUs of the VMs that run the application; and summing a product of the host application license cost and the CPU proportion for each core license.

17. The computer system of claim 10, further comprises:
moving one of the VMs from a server computer to a second server computer when one of the application socket license cost and application core license cost is lower for the second server computer; and
not moving one of the VMs from a server computer to a second server computer when one of the application socket license cost and application core license cost is higher for the second server computer.

18. The computer system of claim 10 wherein consolidating the VMs to run on fewer of the number of server computers when the computational capacity of the fewer server computers is available further comprises powering off unused server computers of the number of server computers.

19. A non-transitory computer-readable medium encoded with machine-readable instructions that implement a method carried out by one or more processors of a computer system to perform the operations of
determining virtual machines ("VMs") that form the virtual data center that runs on a number of server computers of the physical data center;
for each VM,
determining one or more application blueprints stored in the one or more data-storage devices and used to create the VM,
determining one or more applications that run in the VM based on the one or more application blueprints, wherein each of the one or more applications is associated with two or more of an application instance license cost, an application socket license cost, and an application core license cost, and
computing a total VM application licensing cost of the one or more applications to run on fewer of the server computers based on the two or more of the application instance license cost, the application socket license cost, and the application core license cost of each of the one or more applications to run on the fewer server computers;
computing a total application license cost as a sum of the total VM application licensing cost computed for each VM;
computing a power cost associated with consolidating the VMs onto a consolidated number of server computers that is less than the number of server computers;
determining that a computational capacity of the consolidated number of server computers is available; and
consolidating the VMs onto the fewer server computers in response to the computational capacity of the fewer server computers being available, and the total application license cost being less than the power cost resulting from consolidating the VMs to the fewer server computers.

20. The medium of claim 19, further comprising:
for each VM,
computing a wastage of the one or more applications that run in the VM, and
generating an alert when the wastage is greater than a wastage threshold.

21. The medium of claim 20, wherein computing the wastage further comprises:
for each of the one or more applications that run in the VM,
determining an application license cost paid for each of the one or more applications,
computing an actual utilization license cost for each of the one or more applications,
computing a difference between the application license cost paid and the actual utilization license cost; and
summing the difference for each of the one or more applications to generate the wastage.

22. The medium of claim 19, wherein computing the total VM application license cost further comprises:
for each application of the one or more applications,
when the application has an instance license, computing the instance license cost based on a number of virtual central processing units ("vCPUs") the VM uses to run the application,
when the application has a socket license, computing the socket license cost based on a number of sockets of a server computer used to run the VM, and
when the application has a core license, computing the core license cost based on a number of cores of the server computer used to run the VM.

23. The medium of claim 22, wherein computing the instance license cost further comprises:
for each vCPU license,
determining a vCPU license cost from a general ledger, and
determining a vCPU multiplying factor equal to a number of vCPUs the VM uses to run the application;
for each user license,
determining a user license cost from the general ledger, and
determining a user multiplying factor equal to a number of users of the application; and
summing a product of the vCPU license cost and the vCPU multiplying factor and a product of the user license cost and the user multiplying factor, for each vCPU license and user license.

24. The medium of claim 22, wherein computing the socket license cost further comprises:
determining a number of sockets of processors of the server computer;
for each socket license of one of the sockets,
determining application license cost per socket from a general ledger,
computing a host application license cost as a product of the application license cost per socket and the number of sockets, and
determining a CPU proportion factor equal to a number of vCPUs used by the VM divided by a total number of vCPUs of the VMs that run the application; and
summing a product of the host application license cost and the CPU proportion factor for each socket license.

25. The medium of claim 22, wherein computing the core license cost further comprises
determining a number of cores of processors of the server computer;
for each core license of one of the cores,
determining application license cost per core from a general ledger,
computing a host application license cost as a product of the application license cost per core and the number of cores, and
determining a CPU proportion factor equal to number of vCPUs used by the VM divided by a total number of vCPUs of the VMs that run the application; and summing a product of the host application license cost and the CPU proportion for each core license.

26. The medium of claim 19, further comprises:

moving one of the VMs from a server computer to a second server computer when one of the application socket license cost and application core license cost is lower for the second server computer; and not moving one of the VMs from a server computer to a second server computer when one of the application socket license cost and application core license cost is higher for the second server computer.

27. The medium of claim 19 wherein consolidating the VMs to run on fewer of the number of server computers when the computational capacity of the fewer server computers is available further comprises powering off unused server computers of the number of server computers.

* * * * *